US009956655B2

(12) United States Patent
Yamamoto

(10) Patent No.: US 9,956,655 B2
(45) Date of Patent: May 1, 2018

(54) APPARATUS FOR GENERATING ASSEMBLY SEQUENCE AND METHOD FOR GENERATING ASSEMBLY SEQUENCE

(71) Applicant: HITACHI, LTD., Tokyo (JP)

(72) Inventor: Noriaki Yamamoto, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days. days.

(21) Appl. No.: 15/122,710

(22) PCT Filed: Jan. 21, 2015

(86) PCT No.: PCT/JP2015/051493
§ 371 (c)(1),
(2) Date: Aug. 31, 2016

(87) PCT Pub. No.: WO2015/136987
PCT Pub. Date: Sep. 17, 2015

(65) Prior Publication Data
US 2017/0066092 A1 Mar. 9, 2017

(30) Foreign Application Priority Data
Mar. 11, 2014 (JP) ................ 2014-048106

(51) Int. Cl.
G06F 17/50 (2006.01)
B23P 21/00 (2006.01)
(Continued)

(52) U.S. Cl.
CPC ............. B23P 21/00 (2013.01); G05B 17/02 (2013.01); G05B 19/41805 (2013.01);
(Continued)

(58) Field of Classification Search
None
See application file for complete search history.

(56) References Cited

U.S. PATENT DOCUMENTS 6,157,902 A    12/2000 Hirata et al.
6,725,184 B1    4/2004 Gadh et al.
(Continued)

FOREIGN PATENT DOCUMENTS

EP    2669824 A1      4/2013
EP    2669824 A1 * 12/2013    ............. G06F 17/50
(Continued)

OTHER PUBLICATIONS

Gu et al. (CAD.directed automatic assembly sequence planning).*
(Continued)

Primary Examiner — Miranda Huang
Assistant Examiner — Hung Dang
(74) Attorney, Agent, or Firm — Volpe and Koenig, P.C.

(57) ABSTRACT

An apparatus for generating assembly steps and an assembly sequence for sequentially assembling a product is provided with: a part detecting section for detecting designated characteristic shapes from the 3D CAD model, detecting a part present in a radial direction of each characteristic shape, and detecting a part present in an axial direction of the detected part; a section for generating a directed graph where a node denotes a part and a directed edge denotes a connection precedence relationship between parts; an assembly graph generating section for generating, an assembly graph where a node denotes a part and an edge denotes an adjacency relationship; a work order adding section for adding work contents and work orders to a list of the detected unconnected parts; and a generating section for generating the assembly sequence and an assembly direction by generating and reversely converting a disassemblable direction and a disassembly sequence.

10 Claims, 31 Drawing Sheets

(51) Int. Cl.
*G05B 17/02* (2006.01)
*G05B 19/418* (2006.01)

(52) U.S. Cl.
CPC .......... *G06F 17/50* (2013.01); *G06F 17/5086* (2013.01); *G05B 2219/31056* (2013.01); *G05B 2219/35134* (2013.01); *G06F 2217/12* (2013.01); *Y02P 90/04* (2015.11); *Y02P 90/265* (2015.11)

(56) References Cited

U.S. PATENT DOCUMENTS

| | | | | |
|---|---|---|---|---|
| 2011/0022432 A1* | 1/2011 | Ishida | .................... | G06Q 10/06 705/7.42 |
| 2011/0087350 A1* | 4/2011 | Fogel | ..................... | G06F 17/50 700/98 |
| 2016/0116911 A1 | 4/2016 | Yamamoto et al. | | |

FOREIGN PATENT DOCUMENTS

| | | | | |
|---|---|---|---|---|
| JP | 10-240324 | A | 9/1998 | |
| JP | 3689226 | B2 | 8/2005 | |
| JP | 3705672 | B2 | 10/2005 | |
| JP | 2008-046924 | A | 2/2008 | |
| JP | 4505277 | B2 | 7/2010 | |
| JP | 2012-014569 | A | 1/2012 | |
| JP | 2012-155424 | A | 8/2012 | |
| WO | WO 2012101895 | A1 * | 8/2012 | ............. G06F 17/50 |
| WO | 2014/199461 | A1 | 12/2014 | |

OTHER PUBLICATIONS

Ong et al. (Automatic Subassembly Detection from a Product Model for Disassembly Sequence Generation).*
Lin et al. (Inferring CSG-Based Object Representation Using Range Image, in Pattern Recognition: Architectures, Algorithms and Applications pp. 369-370).*

* cited by examiner

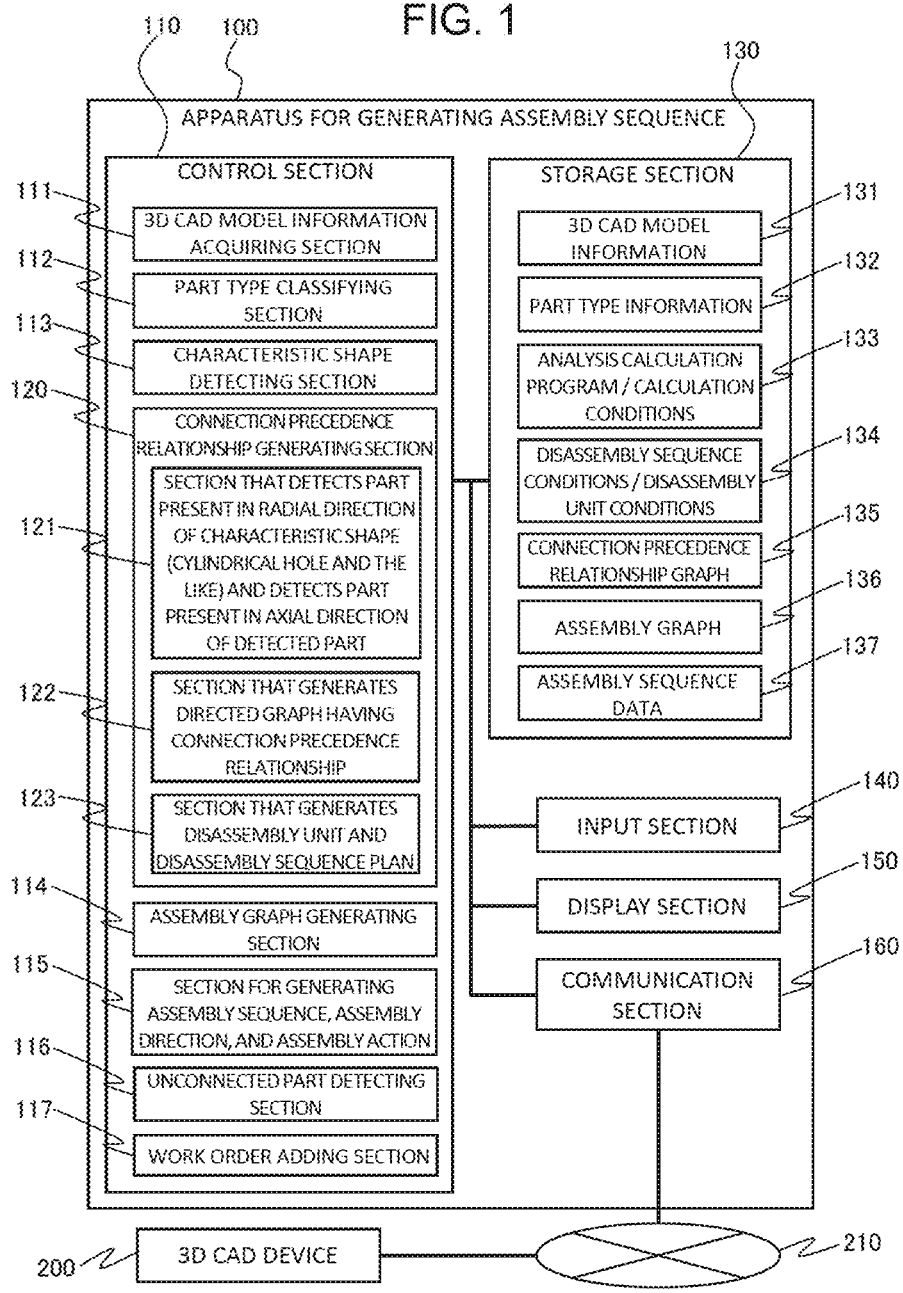

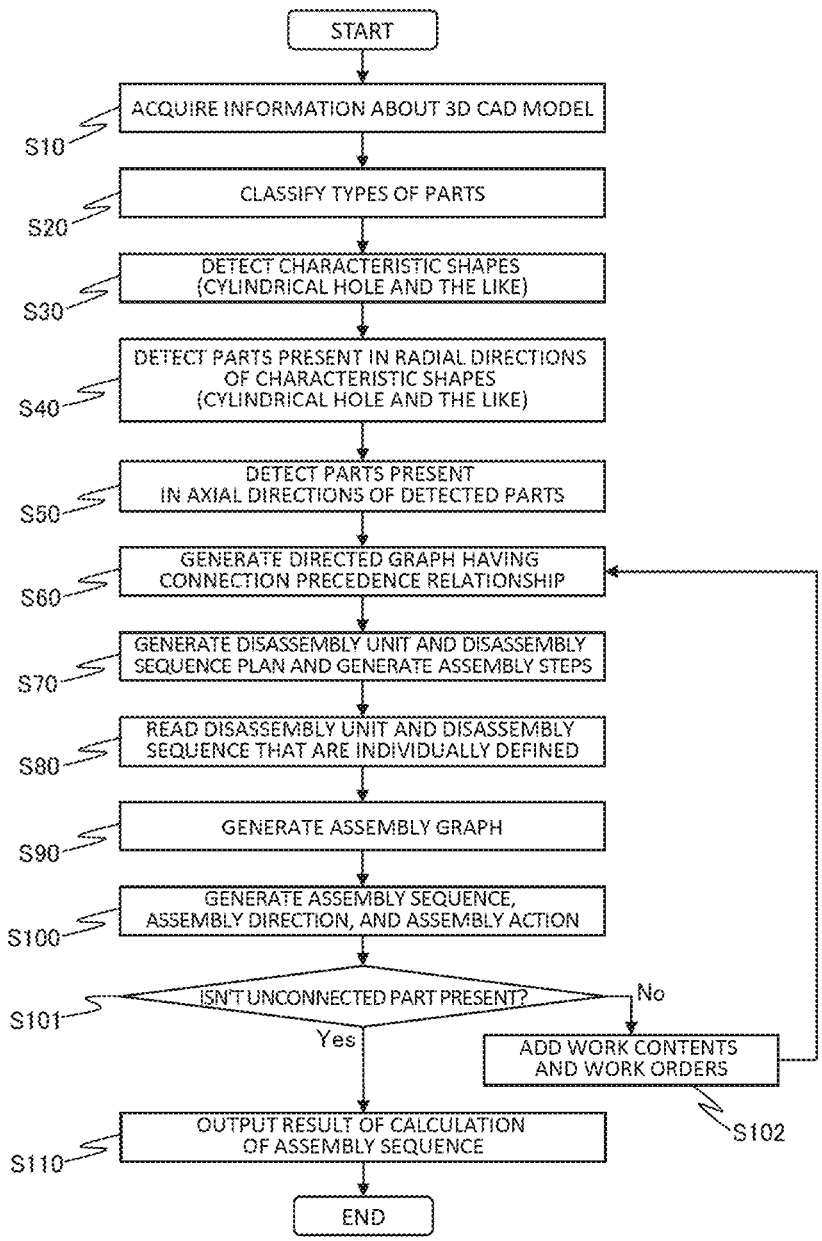

| | CLASSIFICATION | ITEM | EXAMPLE |
|---|---|---|---|
| 1 | PART ATTRIBUTES | PART ID | 5 |
| 2 | | CLASS NUMBER | 2 |
| 3 | | MODEL NAME | A_FRAME |
| 4 | | PART DRAWING NUMBER | A12345 |
| 5 | | PART TITLE | A |
| 6 | | MATERIAL | SPCC |
| 8 | SHAPE CHARACTERISTICS | VOLUME | 10000 |
| 9 | | SURFACE AREA | 9600 |
| 10 | | MAXIMUM LENGTH | 160 |
| 11 | | CENTROID | 10, 5, 30 |
| 12 | | BOUNDING BOX | 5 |
| 13 | | .... | ... |
| 14 | PART ARRANGEMENT | PART X AXIS | 1, 0, 0 |
| 15 | | PART Y AXIS | 0, 1, 0 |
| 16 | | PART Z AXIS | 0, 0, 1 |
| 17 | | PART ORIGIN | 0, 5, 0 |
| 18 | PART CONFIGURATION | PARENT PART ID | 4 |
| 19 | | CHILD PART ID | 5 |
| 20 | ADJACENCY RELATIONSHIP BETWEEN PARTS | TYPE OF RESTRICTED ELEMENT | SURFACE COINCIDENCE |
| 21 | | PART ID INCLUDING RESTRICTED ELEMENT | 5 |
| 22 | | RESTRICTED PART ID | 7 |
| 23 | | RESTRICTED SURFACE NORMAL LINE | 0, 0, 1 |
| 24 | | RESTRICTED SURFACE ORIGIN | 0, 0, 0 |
| 25 | MARK FOR POSITIONING | CONNECTION FEATURE TYPE | PONCH |
| 26 | | PART ID INCLUDING CONNECTION FEATURE | 8 |
| 27 | | CONNECTION TARGET PART ID | 10 |

| ID | NAME OF PART TYPE | DETERMINATION CONDITIONS OF PART ATTRIBUTES OF 3D CAD MODEL | | | |
|---|---|---|---|---|---|
| | | MODEL NAME | PART DRAWING NUMBER | TITLE OF PART NAME | DIMENSIONAL CONDITIONS |
| 1 | SCREW | *Screw* | 1234* | | |
| 2 | SCREW | | | SCREW* | |
| 3 | COUNTERSUNK SCREW | SC* | 5522* | COUNTERSUNK SCREW | |
| 4 | RETAINING RING | Etomewa* | | E RETAINING RING | |
| 5 | RETAINING RING | Ctomewa* | 2224* | C RETAINING RING | |
| 6 | O-RING (SMALL) | | O* | *RING* | MAXIMUM DIMENSION EQUAL TO OR SMALLER THAN 100 |
| 7 | O-RING (LARGE) | | O* | *RING* | MAXIMUM DIMENSION LARGER THAN 100 |
| 8 | RIVET | | | RIVET | |
| ..... | ..... | ..... | | | |

FIG. 5
| No | PART ID | SHAPE ID | TYPE OF SHAPE | CENTER POINT COORDINATE VALUES(x, y, z) | AXIAL VECTORS (z1, z2, z3) | DIMENSIONAL ATTRIBUTES (D, D2, L, A) |
|---|---|---|---|---|---|---|
| 1 | 1 | 78 | CYLINDER | -144, 88, 25 | 0, 0, -1 | 9, 0, 10, 0 |
| 2 | 1 | 114 | CYLINDER | -102, 102, 5 | 0, 0, -1 | 16, 0, 10, 0 |
| 3 | 1 | 1527 | QUARTER CYLINDER | -54, 61, 20 | 1, 0, 0 | 46, 0, 18, 45 |
| 4 | 2 | 390 | CYLINDER | 80, 86, 105 | 0, 0, 1 | 10, 0, 7, 0 |
| 5 | 2 | 428 | CYLINDER | 31, 36, 105 | 0, 0, 1 | 6, 0, 53, 0 |
| 6 | 5 | 194 | CIRCULAR RING | -59, 61, 8 | 0, 1, 0 | 30, 37, 3.5, 0 |
| 7 | 10 | 120 | CYLINDER | -102, -102, 5 | 0, 0, 1 | 16, 0, 10, 0 |
| ... | | | | | | |
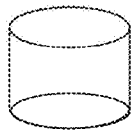
CYLINDER
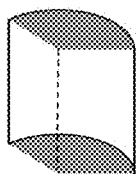
QUARTER CYLINDER
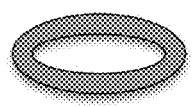
CIRCULAR RING

| No | PART ID | SHAPE ID | TYPE OF SHAPE | COORDINATE VALUES(x, y, z) of LIGHT RAY STARTING POINT | DIRECTION VECTORS (z1, z2, z3) of LIGHT RAY | DETECTED PART (ID, Distance) |
|---|---|---|---|---|---|---|
| 1 | 1 | 78 | CYLINDER | -144, 88, 25 | 1, 0, 0 | 15, 4 |
| 2 | 1 | 78 | CYLINDER | -144, 88, 25 | 1, 0, 0 | 15, -4 |
| 3 | 1 | 114 | CYLINDER | -102, 102, 5 | 1, 0, 0 | 24, 7 |
| 4 | 1 | 114 | CYLINDER | -102, 102, 5 | 1, 0, 0 | 24, -7 |
| 5 | 1 | 1527 | QUARTER CYLINDER | -54, 61, 20 | 0, 0, 1 | 24, 22 |
| 6 | 1 | 1527 | QUARTER CYLINDER | -54, 61, 20 | 0, 0, 1 | 24, -22 |
| 7 | 2 | 390 | CYLINDER | 80, 86, 105 | 0, 1, 0 | 15, 4 |
| 8 | 2 | 390 | CYLINDER | 80, 86, 105 | 0, 1, 0 | 15, -4 |
| 9 | 5 | 194 | CIRCULAR RING | -59, 61, 8 | 0, 0, 1 | 18, 14 |
| 10 | 5 | 194 | CIRCULAR RING | -59, 61, 8 | 0, 0, 1 | 18, -14 |
| ... | ... | ... | ... | ... | ... | ... |

ASSEMBLY STATE

STATE IN WHICH FASTENING
PORTION IS SEPARATED

STATE IN WHICH FASTENING
PART IS SEPARATED

FIG. 9

| No | PART ID | PART TYPE | LIGHT RAY DISTINGUISH-MENT | COORDINATE VALUES (x, y, z) of LIGHT RAY STARTING POINT | DIRECTION VECTORS (z1, z2, z3) of LIGHT RAY | DETECTED PART (ID, Distance) |
|---|---|---|---|---|---|---|
| 1 | 1 | SCREW | CENTER | 80, 36, 111 | 0, 0, 1 | (46, 52), (2, -80), (5, -90) |
| 2 | 1 | SCREW | OUTSIDE | 80, 40, 111 | 0, 0, 1 | (50, 75) |
| 3 | 2 | BOLT | CENTER | 55, 55, 171 | 0, -1, 0 | (46, -2) |
| 4 | 2 | BOLT | OUTSIDE | 58, 55, 171 | 0, -1, 0 | (46, 5) |
| ... | ... | ... | ... | ... | ... | ... |

CONNECTION PRECEDENCE RELATIONSHIP LIST

| LIGHT RAY SCANNING IN RADIAL DIRECTION<br>· 500 : 601→602→603 |
|---|
| LIGHT RAY SCANNING IN AXIAL DIRECTION<br>· 500 : 701(OBSTRUCTION b),<br>        702(OBSTRUCTION c),<br>        703(OBSTRUCTION d) |

DIRECTED GRAPH HAVING CONNECTION PRECEDENCE RELATIONSHIP

| No | PART ID | PART NAME | ADJACENT PART ID | PART NAME | ADJACENCY RELATIONSHIP | WORK CONTENTS | WORK ORDER |
|----|---------|-----------|------------------|-----------|------------------------|---------------|------------|
| 1 | 801 | BASE | 802 | COVER | FLAT SURFACE (ID=1) | WELDING | 802→801 |
| 2 | | | | | FLAT SURFACE (ID=2) | WELDING | 802→801 |
| 3 | 803 | L BLOCK | 805 | PLATE | FLAT SURFACE (ID=3) CYLINDRICAL HOLE | (SCREW FASTENING: M4L50) | (SCREW →805→803) |
| 4 | | | | | FLAT SURFACE (ID=4) CYLINDRICAL HOLE | (SCREW FASTENING: M4L50) | (SCREW →805→803) |
| 5 | 903 | PRESS-FIT PIN | ... | ... | ... | PRESS-FITTING | 903 →802→801 |
| 6 | 805 | PLATE | 802 | COVER | (ADDITION) | ... | 802→805 |
| ... | ... | ... | ... | ... | ... | ... | ... |

| No. | ADJACENCY RELATIONSHIP | PART TYPE (1) | PART TYPE (2) | SHAPE/ DIMENSION CONDITION | WORK CONTENTS | CONDITION OF GENERATION OF WORK ORDER |
|---|---|---|---|---|---|---|
| 1 | FLAT SURFACE | PLATE | ... | ADJACENT SURFACE 100 mm² OR LESS | ADHESION | LIGHT PART → HEAVY PART |
| 2 | FLAT SURFACE | PLATE | ... | ADJACENT SURFACE 100 mm² OR MORE | WELDING | LIGHT PART → HEAVY PART |
| 3 | FLAT SURFACE, CYLINDRICAL HOLE | ... | ... | ADJACENT CYLINDRICAL HOLES ARE COAXIAL AND DIAMETERS OF HOLES AND DIAMETERS OF FEMALE SCREWS ARE FOR M4 | M4-SCREW | SCREW → HOLE-SIDE PART → FEMALE SCREW-SIDE PART |
| 4 | FLAT SURFACE, CYLINDRICAL HOLE | ... | ... | ADJACENT CYLINDRICAL HOLES ARE COAXIAL AND DIAMETERS OF HOLES AND DIAMETERS OF FEMALE SCREWS ARE FOR M5 | M5-SCREW | SCREW → HOLE-SIDE PART → FEMALE SCREW-SIDE PART |
| ... | ... | ... | ... | ... | ... | ... |

ASSEMBLABLE PRODUCT MODEL IN WHICH SCREW IS NOT MODELED

DIAGRAM ILLUSTRATING SCREW THAT IS ESTIMATED FROM ADJACENCY RELATIONSHIP OF POSITION AND POSTURE OF CYLINDRICAL HOLE

DIRECTED GRAPH HAVING CONNECTION PRECEDENCE RELATIONSHIP BASED ON ESTIMATED SCREW

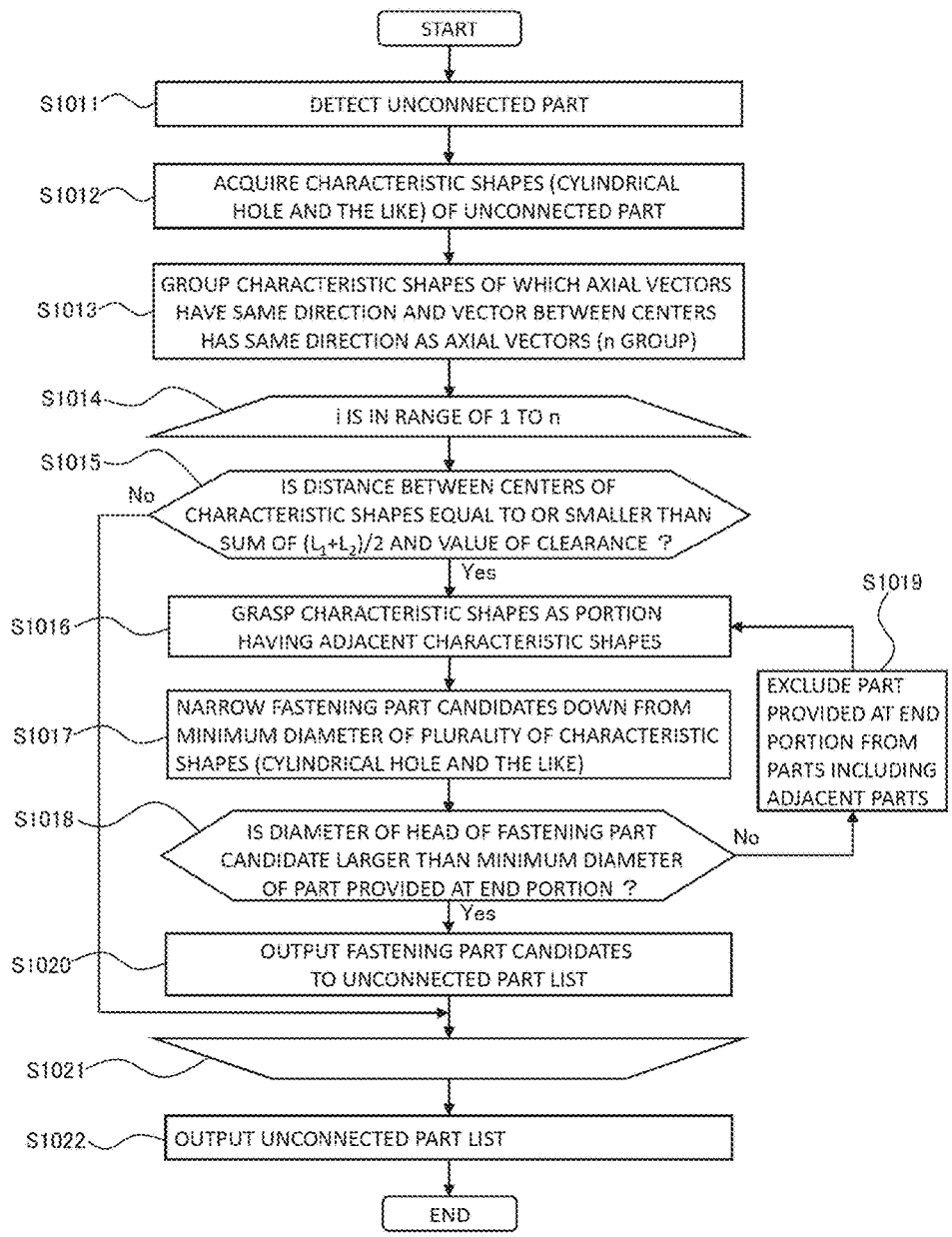

APPARATUS FOR GENERATING ASSEMBLY SEQUENCE AND METHOD FOR GENERATING ASSEMBLY SEQUENCE

TECHNICAL FIELD

The present invention relates to an apparatus and a method for generating an assembly sequence for parts from CAD data of an assemblable product.

BACKGROUND ART

There is JP 3689226 B1 (Patent Document 1) as the related art in this technical field. This publication discloses "a structure including: interference calculation means for performing calculation including the determination of occurrence of interference and the shortest distance between a part, which is being disassembled, and a remaining part during disassembly; and means for searching for a disassembly path for avoiding the occurrence of interference between parts while allowing the interference calculation means to perform the calculation".

Further, there is JP 3705672 B1 (Patent Document 2). This publication discloses "a structure including: means for inputting CAD data to which connection information between parts required for an assembly work plan and information about a sub-assemblable product to be generated, a part assembly sequence, a robot, a jig, and the like are added; means for describing connection information about a part unit of each part required for the assembly of the product on the basis of the CAD data by a liaison graph in each axial direction; and means for generating an assembly sequence Petri net on the basis of the liaison graph, a part for a jig target, and restriction conditions".

Furthermore, there is JP 4505277 B1 (Patent Document 3). This publication discloses "a work manual creating device including: a part information storage section that stores attribute information of parts of a product for the respective parts; an annotation information storage section that stores annotation information of the parts; a part relationship-information storage section that stores part relationship information between the parts and other parts; an annotation generating section that searches the part information storage section, the annotation information storage section, and the part relationship-information storage section about the work target parts and parts, which are related to the work target parts in terms of work, to generate work contents and annotation items for each work; and a work manual creating section that lays the assembly structure diagram, a work diagram, the work contents, and the annotation items out to create a work manual".

Moreover, a support tool using 3D CAD has a function to search for and arrange a part corresponding to the shape of a hole of 3D CAD of a standard part, such as a bolt.

CITATION LIST

Patent Document

Patent Document 1: JP 3689226 B1
Patent Document 2: JP 3705672 B1
Patent Document 3: JP 4505277 B1

SUMMARY OF THE INVENTION

Problems to be Solved by the Invention

In Patent Document 1, it is necessary to perform interference calculation during disassembly to search for the disassembly path. Further, in Patent Document 2, it is necessary to add the state of a sub-assemblable product, which is required for the assembly work plan, and a part assembly sequence to CAD data. Furthermore, since annotation information and part relationship information are searched to create work contents and annotation items for the creation of the work manual in Patent Document 3, the annotation items corresponding to a part assembly relationship are generated. However, since the shapes of work portions, such as a cylindrical hole and a surface, are not combined each other and the combinations of parts correspond to the annotation items, information is not allocated correctly. Moreover, assembly steps or an assembly sequence are not generated.

A fastening part or the like corresponding to the shape of a hole can be searched and arranged by the function of the support tool using 3D CAD. However, examination often progresses without the modeling of a fastening part in an uncertain state such as a conceptual design step. Further, when the 3D CAD modeling of a large-sized assemblable product model is performed, the modeling of standard parts is often omitted to improve the response of a CAD operation. For this reason, when a bolt is automatically arranged in this way, correction man-hour is generated or the deterioration of the response of CAD is caused. However, information about fastening parts and the like is required for the examination of assembly steps or an assembly sequence.

According to the invention, an adjacency relationship between parts and a connection precedence relationship between parts are calculated for a three-dimensional assemblable product model (3D CAD model) of a conceptual design step or a 3D CAD model of a large-sized assemblable product, and parts having the degree of freedom, that is, unconnected parts are automatically detected on the basis of a relationship diagram. A work sequence and work contents are allocated from a combination relationship of the shapes of adjacent portions of the detected unconnected parts and parts having the adjacency relationship, and a partial work sequence, which is the result thereof, is added to the connection precedence relationship. Assembly steps and an assembly sequence are deduced on the basis of information that includes the adjacency relationship and the connection precedence relationship, and the evaluation of workability is performed on the basis of an assembly sequence plan thereof. Accordingly, an object of the invention is to provide an apparatus and method for generating an assembly sequence that automatically calculate an assembly sequence in a design step.

Solutions to Problems

In order to achieve the object, according to the invention, there is provided an apparatus for generating assembly steps and an assembly sequence for sequentially assembling a plurality of parts of an assemblable product. The apparatus includes: an information acquiring section that extracts, from a three dimensional computer-aided design (3D CAD) model, information about a part attribute, part arrangement, and an adjacency relationship with other parts for each of the plurality of parts; a part type classifying section that classifies types of parts from information about the 3D CAD model; a characteristic shape detecting section that detects designated characteristic shapes from the 3D CAD model; a part detecting section that detects a part present in a radial direction of each of the detected characteristic shapes and detects a part present in an axial direction of the detected part in the 3D CAD model; a section that generates a directed graph, in which a node denotes a part and a directed edge denotes a connection precedence relationship between parts and which has a connection precedence relationship, on the basis of results of the detection of the parts; a disassembly sequence plan generating section that generates a disassembly unit and a disassembly sequence plan on the basis of the connection precedence relationship; an assembly graph generating section that generates an assembly graph, in which a node denotes a part and an edge denotes an adjacency relationship and which represents a relationship between parts, on the basis of adjacency relationship information between parts of the 3D CAD model information; an unconnected part detecting section that detects unconnected parts on the basis of the connection precedence relationship and the assembly graph; a work order adding section that adds work contents and work orders to a list of the detected unconnected parts to return to processing in the section that generates the directed graph having the connection precedence relationship; and an assembly sequence/assembly direction/assembly action generating section that deduces an assembly sequence and an assembly direction for reversely converting a disassemblable direction and a disassembly sequence by generating the disassemblable direction and the disassembly sequence on the basis of the generated disassembly unit, the generated disassembly sequence plan, and the generated assembly graph.

Further, in order to achieve the object, in the apparatus for generating an assembly sequence according to the invention, the part detecting section detects a fastening part by performing light ray scanning in the radial direction of the characteristic shape, and detects other parts, which are obstructive to the disassembly of the fastening part, by performing light ray scanning in an axial direction of the fastening part; and the section, which generates the directed graph having the connection precedence relationship, represents a relationship between the fastening part, which is detected by the part detecting section, and a fastening target part to which the fastening part is fastened and a relationship between the fastening part and other parts, which are obstructive to the disassembly of the fastening part, as the connection precedence relationship; and generates a graph in which a node denotes a part ID and a directed edge denotes the connection precedence relationship between parts.

Furthermore, in order to achieve the object, in the apparatus for generating an assembly sequence according to the invention, the unconnected part detecting section detects parts, which have the adjacency relationship but do not have the connection precedence relationship, as unconnected parts on the basis of the assembly graph and the connection precedence relationship created from the 3D CAD model information; and outputs an unconnected part list including information about parts, which form the unconnected parts, adjacent parts, and the adjacency relationship.

In addition, in order to achieve the object, according to the invention, there is provided a method of generating an assembly sequence that generates information about assembly steps and an assembly sequence for sequentially assembling a plurality of parts of an assemblable product by using a computer. The method includes, as processing steps performed by the computer: an information acquiring step of extracting, from a three dimensional computer-aided design (3D CAD) model, information about a part attribute, part arrangement, and an adjacency relationship with other parts for each of the plurality of parts; a part type classifying step of classifying types of parts from information about the 3D CAD model; a characteristic shape detecting step of detecting designated characteristic shapes from the 3D CAD model; a part detecting step of detecting a part present in a radial direction of each of the detected characteristic shapes and detecting a part present in an axial direction of the detected part in the 3D CAD model; a step of generating a directed graph, in which a node denotes a part and a directed edge denotes a connection precedence relationship between parts and which has a connection precedence relationship, on the basis of results of the detection of the parts; a disassembly sequence plan generating step of generating a disassembly unit and a disassembly sequence plan on the basis of the connection precedence relationship; an assembly graph generating step of generating an assembly graph, in which a node denotes a part and an edge denotes an adjacency relationship and which represents a relationship between parts, on the basis of adjacency relationship information between parts of the 3D CAD model information; an unconnected part detecting step of detecting unconnected parts on the basis of the connection precedence relationship and the assembly graph; a work order adding step of adding work contents and work orders to a list of the detected unconnected parts to return to processing in the step of generating the directed graph having the connection precedence relationship; and an assembly sequence/assembly direction/assembly action generating step of deducing the assembly sequence and an assembly direction for reversely converting a disassemblable direction and a disassembly sequence by generating the disassemblable direction and the disassembly sequence on the basis of the generated disassembly unit, the generated disassembly sequence plan, and the generated assembly graph.

Effects of the Invention

According to the invention, it is possible to automatically detect unconnected parts by using a three-dimensional assemblable product model of a design step, and to automatically deduce an assembly unit, an assembly sequence, and an assembly direction on the basis of information to which added work contents and work orders are added. Accordingly, an effect of reducing time, which is taken to verify the evaluation of assemblability in a design step, and an effect of reducing the return of a design are obtained on the basis of this result. Further, since automatic arrangement is not performed as a CAD model, the deterioration of the response of a CAD operation does not occur. Furthermore, there is a case in which standard parts, such as fastening parts, are not modeled in an assemblable product model of a conceptual design step or a large-sized assemblable product model, such as a plant. Moreover, there is work, such as welding work, which cannot be determined in only a three-dimensional assemblable product model. Since assembly steps and an assembly sequence are deduced and assemblability is verified after unconnected parts are automatically detected by the invention, a designer's burden is reduced at the time of verification of the assemblability of an assemblable product model of a conceptual design step in which undetermined parts are present. Accordingly, it is possible to easily perform verification whenever a design is changed. Further, since display performance deteriorates when a plurality of standard parts are modeled in a three-dimensional CAD model of a large-sized assemblable product model, the modeling of the standard parts is often omitted. However, since work contents and work orders are searched and assembly steps and an assembly sequence are deduced on the basis of the positions and postures of the shapes of adjacent portions after unconnected parts are automatically detected by the invention, a work sequence can be generated by a simplified large-sized assemblable product model.

Objects, structures, and effects other than the above-mentioned objects, structures, and effects will become clear by the description of the following embodiments.

BRIEF DESCRIPTION OF THE DRAWINGS

FIG. 1 is an example of a diagram illustrating the entire schematic configuration of an apparatus for generating an assembly sequence of the invention.

FIG. 2 is an example of a flowchart illustrating a procedure to processing for generating an assembly sequence and assembly steps on the basis of three dimensional computer-aided design (3D CAD) data according to an embodiment of the invention and processing for outputting assembly sequence calculation results.

FIG. 3 is an example of a 3D CAD model information table that is stored in a storage section of the apparatus for generating an assembly sequence.

FIG. 4 is an example of a part type information table that is stored in the storage section of the apparatus for generating an assembly sequence.

FIG. 5 is an example of results of the detection of a cylindrical hole, a quarter cylinder, and a circular ring from an assemblable product model.

FIG. 9 is an output example of results of the light ray scanning in the disassembly direction (an axial direction) of the fastening part.

FIG. 27 is a diagram illustrating a work estimation table.

FIG. 29 is a flowchart illustrating an example of a method of estimating a fastening relationship that is based on an adjacency relationship between cylindrical holes.

MODE FOR CARRYING OUT THE INVENTION

Figure 6:
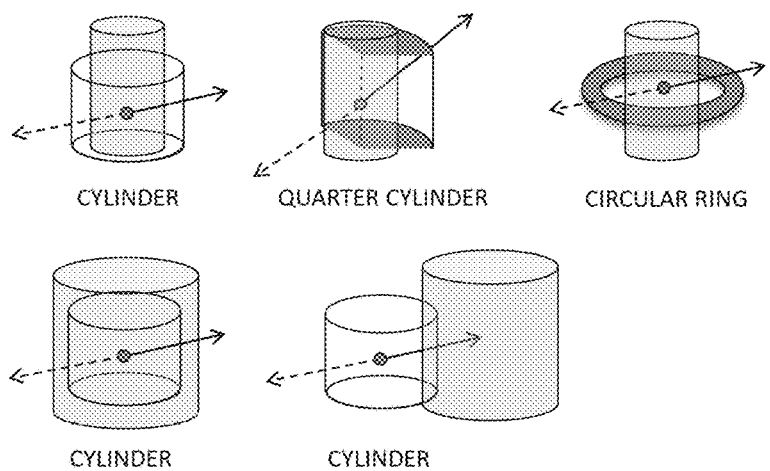
FIG. 6 is an output example of parts and distances that are detected by the operation of a light ray in a radial direction of the cylindrical hole.

The invention will be described below by using embodiments with reference to the drawings.

First Embodiment

An apparatus 100 for generating an assembly sequence will be described in this embodiment. The apparatus 100 for generating an assembly sequence classifies types of parts on the basis of 3D CAD data of a product designed by a 3D CAD device 200 illustrated in FIG. 1; detects characteristic shapes; generates a connection precedence relationship; generates an assembly graph in which an adjacency relationship between parts is integrated; and generates an assembly sequence, an assembly direction, and an assembly action for a product.

FIG. 1 is an example of a diagram illustrating the entire schematic configuration of an apparatus 100 for generating an assembly sequence that is applied to a first embodiment of the invention. The apparatus 100 for generating an assembly sequence includes: an input section 140, such as a keyboard or a mouse, which inputs configuration information required for analysis, instructs a menu to be selected, or inputs other instructions and the like; a display section 150 that displays a model to be evaluated, displays input information, displays processing results, displays details in the middle of processing, and the like; a control section 110 that classifies the types of parts on the basis of 3D CAD data, detects characteristic shapes, generates a connection precedence relationship, generates an assembly graph, generates an assembly sequence, an assembly direction, and an assembly action, processes the output of results thereof, and the like; a storage section 130 that stores 3D CAD data, an analysis calculation program, calculation conditions, results of calculation, and the like; and a communication section 160 that receives 3D CAD data from an external 3D CAD device 200 through a network 210.

Here, the control section 110 includes a CPU (central processing unit), a ROM (read-only memory), and a RAM (random access memory); and the storage section 130 is formed of an external storage device, such as a hard disk drive. For example, a keyboard, a touch panel, a dedicated switch or sensor, or a voice recognition device may be used as the input section 140. For example, a device, which displays information on a screen, such as a display, a projector, or a head mount display is used as the display section 150. A printer (not illustrated), which outputs information displayed in the display section 150 to a sheet, may be connected to the apparatus 100 for generating an assembly sequence.

Meanwhile, the hardware configuration of these does not need to be a dedicated device and a general computer system, such as a personal computer, can be used as the hardware configuration of these.

The control section 110 of the apparatus 100 for generating an assembly sequence includes a 3D CAD model information acquiring section 111, a part type classifying section 112, a characteristic shape detecting section 113, an assembly graph generating section 114, a section 115 for generating an assembly sequence, an assembly direction, and an assembly action, an unconnected part detecting section 116, a work order adding section 117, and a connection precedence relationship generating section 120.

Further, the connection precedence relationship generating section 120, which deduces a connection relationship between parts, includes a section 121 that detects a part present in the radial direction of a characteristic shape (a cylindrical hole and the like) and detects a part present in the axial direction of the detected part, a section 122 that generates a directed graph having a connection precedence relationship, and a section 123 that generates a disassembly unit and a disassembly sequence plan.

The storage section 130 of the apparatus 100 for generating an assembly sequence includes the storage area for 3D CAD model information (a model to be evaluated: an assemblable product) obtained from the 3D CAD device and 3D CAD model information 131 extracted from the information; the storage area for part type information 132 that is referred for processing for classifying the types of parts and detecting characteristic shapes; the storage area for an analysis calculation program/calculation conditions 133 that stores an analysis calculation program/calculation conditions of each processing section; the storage area for disassembly sequence conditions/disassembly unit conditions 134 that stores disassembly sequence conditions/disassembly unit conditions defined by alignment sequences and the like, such as types, sizes, arrangement positions of parts, separately from the connection precedence relationship; the storage area for a connection precedence relationship graph 135 that stores a connection precedence relationship graph analyzed while paying attention to the types of parts and characteristic shapes from the 3D CAD model; the storage area for an assembly graph 136 that stores an assembly graph generated from an adjacency relationship between parts; and the storage area for assembly sequence data 137 that stores assembly sequence data generated by the section 115 for generating an assembly sequence, an assembly direction, and an assembly action.

FIG. 2 is an example of a flowchart illustrating a procedure to processing in which the apparatus 100 for generating an assembly sequence generates a directed graph having a connection precedence relationship and generates an assembly graph on the basis of 3D CAD data obtained from the 3D CAD device 200 and outputs assembly sequence calculation results.

In processing for acquiring the information about the 3D CAD model in Step S10 of FIG. 2, 3D CAD model information (a model to be evaluated: an assemblable product), which is obtained from the 3D CAD device 200 and stored in the storage section 130, is read; information about the part configuration of the assemblable product, the arrangement of each part, the name and dimensions of the model, part attributes, such as part center positions and part centroid positions, and an adjacency relationship between parts are acquired; and 3D CAD model information 131 having the form illustrated in FIG. 3 is created and stored in the storage section 130. Here, an object to be evaluated is an assembly model that is an assemblable product including a plurality of parts. Meanwhile, this file may be output in the form of XML of which classification and an item are defined as the names of elements and attributes.

A part ID, a class number, a model name, a part drawing number, a part title, and the volume, the surface area, the material, the specific gravity, the mass, the maximum length, the centroid, the bounding box (the coordinates of eight vertexes of a rectangular parallelepiped as boundaries for wrapping a part), the principal moment of inertia, and the principal axis of inertia of a part, and the like are extracted as part attributes and shape characteristics of a classification column of FIG. 3.

Part arrangement is the position and posture of each part on an assembly model arranged in a world coordinate system, and is formed of three axes, that is, an X axis, a Y axis, and a Z axis of a part coordinate system of each part and a part origin.

Part configuration is information about a parent-child relationship between subassemblies and parts of the 3D CAD model, and examples of data items of the part configuration include a parent part ID, a child part ID, a flag that indicates a subassembly, and a flag that indicates a nonobject (information representing non-display or suppression on the 3D CAD model).

An adjacency relationship between parts is assembly restriction information that is set when an assembly model is modeled, and includes the type of a restricted element, a part ID including the restricted element, a restricted target part ID, a restricted surface normal line representing a restricted surface, and a restricted surface origin. Further, the assembly restriction information may be information that is set by a designer at the time of modeling, and may also be acquired from a method of analyzing clearance between parts on the basis of an assembly model. Here, an example of the method of analyzing clearance includes a method of searching for other models, which are present within a clearance distance from the respective surfaces of a part modeled on the basis of a set threshold, and creating information about the positions and postures of the surfaces (a flat surface, a cylindrical surface, a conical surface, and the like) of adjacent parts obtained from the results of the search.

Meanwhile, in regard to restricted surface information that is obtained from information about the clearance analysis and assembly restriction, a point on a surface and a restricted surface normal vector directed to the outside of the model is acquired at the restricted surface origin in the case of a flat surface and a point on an axis is acquired as the restricted surface origin while the axial direction of the cylinder corresponds to a restricted surface normal line vector in the case of a cylindrical surface.

Meanwhile, an operation for modeling the 3D CAD model and an operation for designating a model to be analyzed are omitted in the flowchart of FIG. 2.

In processing for classifying the types of parts of Step S20 of FIG. 2, the part type information 132 of storage section 130 is read and the type of each part stored in the 3D CAD model information 131 acquired in Step S10 is determined on the basis of the conditions of a designated model name (for example, a character string of which the first character is designated, and the like) or designated part dimensions (for example, designated dimensions or less).

FIG. 4 is an example of the part type information 132 that is stored in the storage section 130, and is used for the determination of Step S20. The part type information 132 includes items of determination conditions of part attributes (a model name, a part drawing number, and a part title) of 3D CAD and shape characteristics (dimension conditions) of 3D CAD as information that is used to allocate the part types, and has a configuration in which the name of a part type and the degree of coincidence in the conditions allocated to each row are identified using the ID of a part type. Meanwhile, in the example of FIG. 4, search is performed using items except for blanks as conditions among the conditions allocated to each row. Here, the part drawing number and the part title are text information that is arbitrarily defined for the assembly model or the part model of 3D CAD by a user. Further, in regard to the part attributes of a character string, such as a 3D CAD model name and a part title, not only the complete coincidence of all of the character string but also partial coincidence of the character string may be allocated. Accordingly, a character string, which includes a wildcard character (* or the like) representing an arbitrary character, is stored. Meanwhile, a character string condition column may be added, and conditions, such as complete coincidence, forward coincidence, and rearward coincidence, may be defined. Furthermore, mass characteristics, which can be acquired from the calculation of a 3D CAD model, such as the vertexes of the bounding box, the centroid, and the principal moment of inertia of a part model, other than an example of the dimension conditions may be stored as the shape characteristics. Moreover, in regard to determination using numerical values, conditions, which represent ranges, such as equal, or less, and larger, may be set and conditions of AND and OR of these conditions may be set.

In processing for detecting characteristic shapes (a cylindrical hole and the like) of Step S30 of FIG. 2, designated characteristic shapes (a cylindrical hole and the like) are detected from all parts of an assemblable product model. Here, a cylindrical hole; a quarter cylinder (an unclosed cylinder), such as a corner R or an ellipse; and a shape present in a fitting relationship between parts, such as a circular ring, are designated as the characteristic shapes.

FIG. 5 illustrates an example of results of the detection processing (Step S30). A shape ID is provided for each part ID, unique information is output using an identification key that is formed of a combination of these two kinds of IDs. Types of shapes, that is, a cylinder, a quarter cylinder, and a circular ring are output to the type of a shape. Further, center point coordinate values that represent the positions of the shapes, axial vectors that represent the positions of the shapes, and dimensional attributes that represent the sizes of the shapes are output. Here, the center point coordinate values are coordinate values of the assemblable product model in the world coordinate system; the axial vectors are unit vectors in the world coordinate system; and dimensional attribute values include D, D2, L, and A. An inner diameter is output as D, an outer diameter in the case of a circular ring is output as D2, a length is output as L, and an opening angle in the case of a quarter cylinder is output as A.

In processing for detecting parts present in the radial directions of the characteristic shapes (a cylindrical hole and the like) of Step S40 of FIG. 2, a 3D CAD model is scanned with a ray to the outside from the centers of the characteristic shapes detected in Step S30, for example, the shapes of a cylinder, a quarter cylinder, and a circular ring of the output example illustrated in FIG. 5 in the radial direction, and a surface where the light ray crosses first is detected. A part ID, an ID of the surface, and a distance to the surface are acquired as information about the surface. A command that is called light ray trace or ray-tracing of an API (Application Programming Interface) of 3D CAD may be used in this processing. It is possible to acquire the information of the surface where the light ray crosses and a distance to the surface by designating an emission starting point and a direction of a light ray. Meanwhile, since two half cylinders are generally combined with each other to form one cylinder in the case of the shape of a cylinder, scanning is performed in a direction directed to a position where the circular arc of the half cylinder is divided into two equal portions. Further, in the case of a quarter cylinder, scanning is performed in a direction directed to a position where the circular arc of the quarter cylinder is divided into two equal portions. In the case of a circular ring, scanning is performed in an arbitrary radial direction. Meanwhile, although omitted in the description of the case of the circular ring, there is also an unclosed circular ring even in the case of a circular ring. In this case, as in the case of a quarter cylinder, scanning is performed in a direction directed to a position where the circular arc of the unclosed circular ring is divided into two equal portions.

FIG. 6 illustrates an example of results of detection in the radial directions. Each of the shapes of a cylinder and the like, which becomes unique by an identification key formed of a combination of a part ID and a shape ID, is scanned along a direction vector of a light ray from the coordinates of a light ray starting point. As a result, the ID of a detected part and the distance of the part are output with a plus/minus sign. For example, in examples of Nos. 1 and 2, as the result of the scanning of the cylindrical hole, which has an inner diameter 9, illustrated in FIG. 5 with a light ray in the radial direction, a part having a part ID 15 is detected in the range of −4 mm to +4 mm from a light ray starting point. In examples of Nos. 9 and 10, as the result of the scanning of the circular ring, which has an inner diameter of 30, illustrated in FIG. 5 with a light ray in the radial direction, a part having a part ID 18 is detected in the range of −14 mm to +14 mm from a light ray starting point.

Meanwhile, in regard to the 3D CAD model, there is also a case in which a part inserted into a hole is modeled as a shaft having a diameter larger than the diameter of the hole and the hole and the shaft interfere with each other. For example, in the case of a female screw and a male screw, the female screw is often modeled as the inner diameter of a female screw or the diameter of a prepared hole and the male screw is often modeled as the external form of a screw portion. In this case, in the scanning of the cylindrical hole with a light ray in the radial direction, the surface of a male screw portion cannot be detected in the processing in a range up to the inner diameter of the female screw.

Meanwhile, all results within the range of a wrap rectangular parallelepiped, which covers the entire assemblable product, can also be output by the light ray scanning, but processing for narrowing and reading from the results is lengthy. Accordingly, during light ray scanning in the radial direction, scanning is performed from the center of the hole in the radial direction and not information about a portion up to the inner surface of the shape of the hole but information about a portion up to the outer surface of the shape of the hole is output. In this case, when parts are detected on only one side in the positive and negative directions of a light ray, the parts are determined as parts irrelevant to the hole. When parts are detected on both sides in the positive and negative directions of a light ray, the parts are determined as parts related to the hole.

Further, FIG. 6 illustrates an example in which the centers of a cylindrical hole and the like are used as light ray starting points, but a light ray starting point may be shifted to both sides of the cylindrical hole in the axial direction and light ray scanning may be performed from the centers of end portions to detect relevant parts. However, since calculation processing time is increased when the number of light ray scanning and the number of parts of the assemblable product are increased, it is preferable that the number of light ray scanning is small. Accordingly, an axial length is grasped from the length L of the dimensional attribute values of the detected shape illustrated in FIG. 5, and processing for adding light ray scanning of both end faces is performed in a case in which the axial length is equal to or larger than a previously set threshold when being compared with the previously set threshold.

In processing for detecting parts present in the axial directions of the detected parts of Step S50 of FIG. 2, a part, which is present in the axial direction of a part (hereinafter, referred to as a fastening part) related to a hole obtained in the processing for detecting parts present in the radial directions of the characteristic shapes (a cylindrical hole and the like) of Step S40, is detected. Here, the assembly direction of a standard fastening part, such as a bolt, a set screw, an E-ring, or a C-ring, can be defined from the shape of the standard fastening part. For example, a direction, which is directed to a screw tip from a screw head, is the assembly direction of a screw part. Accordingly, the assembly direction, which is defined for each part type, can be recognized in the processing for classifying the types of parts of Step S20 of FIG. 2.

Further, even though the assembly direction is not defined previously for each part type in this way, the assembly direction of a standard fastening part can be defined from the shape of the standard fastening part. Since a direction, which is directed to a screw tip from a screw head, is the assembly direction of a screw part and a direction, which is directed to an open side from a closed side, is the assembly direction of an E-ring or a C-ring, a direction, which is directed to a part centroid from a part center, can be deduced as the disassembly direction of the part from the shape of a part of 3D CAD. Generally, a part related to a hole, which is detected in Step S40, is often a screw part, and the disassembly direction of the screw part is deduced by the above-mentioned method.

Figure 7:
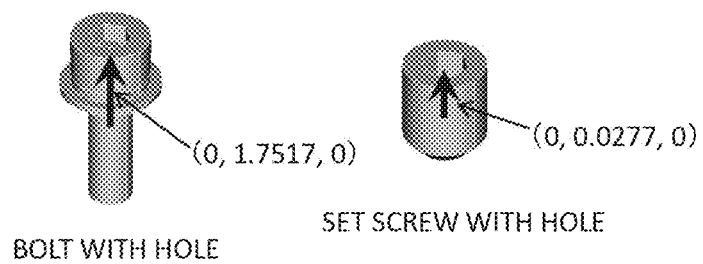
FIG. 7 is an example of results of the calculation of a vector to a centroid from the center of a fastening part.

FIG. 7 illustrates an example of results of the calculation of directions, which are directed to part centroids from part centers of a bolt with a hole and a set screw with a hole. A disassembly direction of a standard screw part or the like can be correctly deduced from the shape of 3D CAD.

In order to detect a part, which causes obstruction, in the disassembly direction (the axial direction) of the fastening part that is deduced as described above, a surface is detected by scanning using light ray as in the processing for detecting parts present in the radial directions. In this case, light ray scanning is also performed in a direction that is shifted to an end portion forming an external form in parallel to the central axis of the part, in addition light ray scanning performed on the central axis of the part. For example, in the case of a bolt with a hole illustrated in FIG. 7, there is also a case in which a part causing obstruction is detected at a screw head even though a part causing obstruction is not detected in light ray scanning only on the central axis.

Figure 8A:
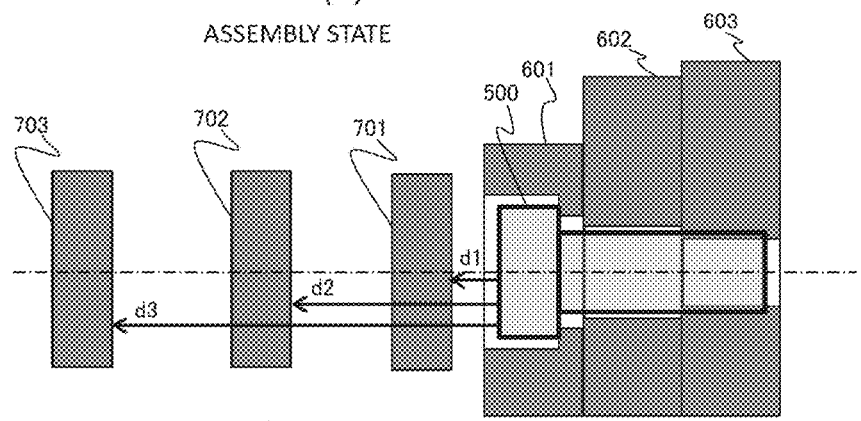
FIG. 8(a) is a diagram illustrating an assembly state in a diagram illustrating a method of detecting an obstructive part in a disassembly direction of the fastening part.

FIG. 8 illustrates an example of the detection of a part that is performed by light ray scanning in the axial direction of the disassembly direction of the fastening part. Since light ray scanning is performed on an assembly model of 3D CAD, processing in an assembly state of FIG. 8(a) is performed. As a result, a cylindrical hole is detected in Step S30 of FIG. 2, and a fastening part 500 is detected in Step S40 by the light ray scanning in the radial direction of a cylindrical hole of a part 601, a cylindrical hole of a part 602, and a cylindrical hole of a part 603. Accordingly, light ray scanning is performed in the disassembly direction (axial direction) of the fastening part in Step S50, and distances to the surfaces, which are close to a light ray starting point, of parts 701, 702, and 703 of FIG. 8 are output. The distances are denoted by d1, d2, and d3, respectively. Meanwhile, the arrowheads of arrows, which extend from the fastening part of FIG. 8, are illustrated at separate positions for convenience of description, but a designated point, such as a point close to the central axis or the outer portion of the fastening part, is used as a light ray starting point.

Here, a distance, which is obtained by light ray scanning, is output as a value having a sign as in the radial direction, and a disassembly direction is referred to as a positive direction. Further, in the calculation of a distance in this case, the end point of the fastening part on the optical axis is set as illustrated by an arrow of FIG. 8 and a distance to the surface, which is close to the end point, of a part, which causes obstruction during disassembly, is output. Meanwhile, the part center, the part centroid, the coordinates of the vertex of the wrap rectangular parallelepiped (bounding box), and the like have been acquired in the processing of Step S10 of FIG. 2 as illustrated in FIG. 3, and a distance to a part that causes obstruction in the disassembly direction may be calculated after a distance is deduced while the light ray starting point is used as the part center.

FIG. 9 illustrates an example of results of the light ray scanning in the axial direction of the disassembly direction of the fastening part. A part ID and a part type of a fastening part that is to be subjected to light ray scanning, the center or outside of the fastening part as light ray distinguishment, the coordinate values of the light ray starting point, a unit vector that represents the direction of a light ray, the part ID and the distance (with a sign) of a part that is detected by the light ray scanning are output.

Figure 8B:
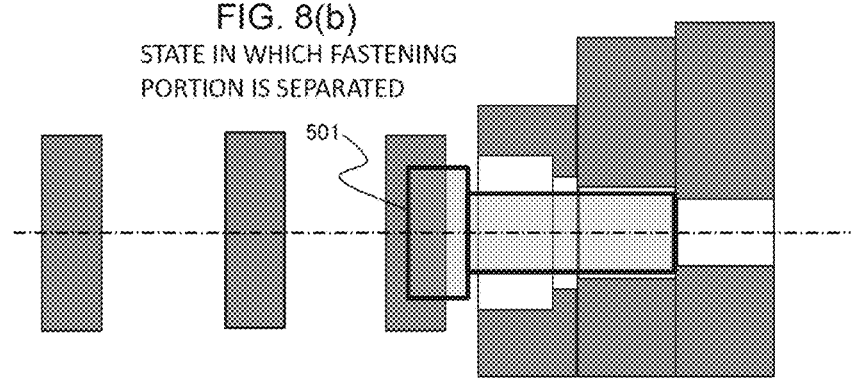
FIG. 8(b) is a diagram illustrating a state in which a fastening portion is separated.
Figure 8C:
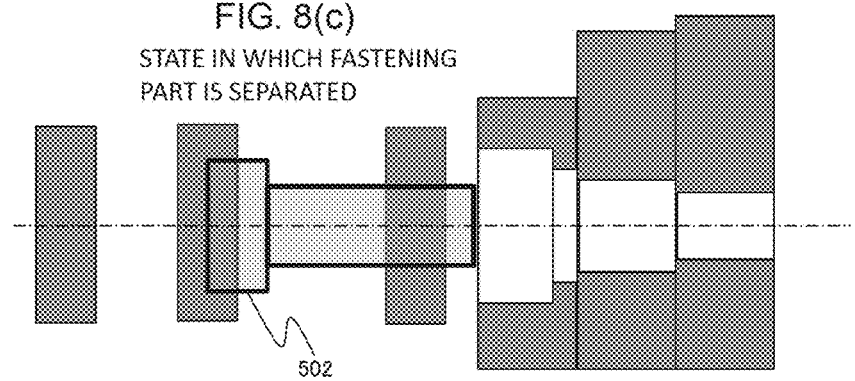
FIG. 8(c) is a diagram illustrating a state in which the fastening part is separated.

FIG. 8(b) is a diagram illustrating a state in which a fastening portion is separated by the length of a female screw, and FIG. 8(c) is a diagram illustrating a state in which the fastening part is separated. A disassembly distance, which allows the fastening part to be separated from each cylindrical hole as described above, can be grasped from the coordinates of the light ray starting point and a part ID in the light ray scanning in the above-mentioned radial direction.

The part ID and the distance of a part, which causes obstruction in each of the state of FIG. 8(b) in which the fastening portion is separated and the state of FIG. 8(c) in which the fastening part is separated, are deduced by the light ray scanning in the assembly state illustrated in FIG. 8(a).

Further, although not illustrated in FIG. 8, the same detection is also performed for a part that causes obstruction up to a state in which the work area of a tool, which is used for the assembly of the fastening part, or a hand is considered.

Meanwhile, the detection of a part, which causes obstruction in each state, has been described above. However, as processing, a distance to the surface, which is detected from the light ray starting point, is output and the distinguishment of each state is performed from the distance and the coordinate values of the center and an end portion of each cylindrical hole of the fastening part.

In processing for generating a directed graph having a connection precedence relationship of Step S60 of FIG. 2, the relationship is represented by a graph on the basis of the results of light ray scanning obtained in Step S40 and Step S50. The graph, which is mentioned here, is a graph in which a node denotes the part ID and a directed edge denotes the connection precedence relationship between parts. FIG. 10 illustrates an example of a graph that is drawn on the basis of a connection precedence relationship obtained from the results of light ray scanning in the assembly state of FIG. 8(a). Here, reference numeral given to each part of FIG. 8 is referred to as a part ID.

As described with reference to FIGS. 8 and 9, the relationship is represented as a directed graph from the list of the results of light ray scanning in the radial direction and the axial direction. Specifically, when the fastening part having a part ID 500 is detected from the results of the light ray scanning of the respective cylindrical holes having part IDs 601, 602, and 603 in the radial direction as illustrated in FIG. 8(a), the light ray starting point of each cylindrical hole is grasped, and the coordinate values of the light ray starting point are projected on an axis of the fastening part parallel to the disassembly direction, it is possible to deduce a sequence for aligning the cylindrical hole with the fastening part. As a result, it is understood that parts, which are fitted to the fastening part 500, are lined up in the order of part IDs of 601, 602, and 603 from the side to which the fastening part 500 is inserted in an order in which the parts are fastened by the fastening part 500.

Further, the part ID and the distance of a part that causes obstruction in each state as illustrated in FIG. 8 can be grasped from the results of the light ray scanning of the fastening part in the disassembly direction. For example, when distance distinguishments b, c, and d, which cause obstruction in the order in which the parts are close to the fastening part, are selected as distinguishment, parts, which cause obstruction during the assembly of the fastening part 500, can be grasped as parts having part IDs 701 (obstruction b), 702 (obstruction c), and 703 (obstruction d) as the result of the light ray scanning in the axial direction.

Figures 10A, 10B:
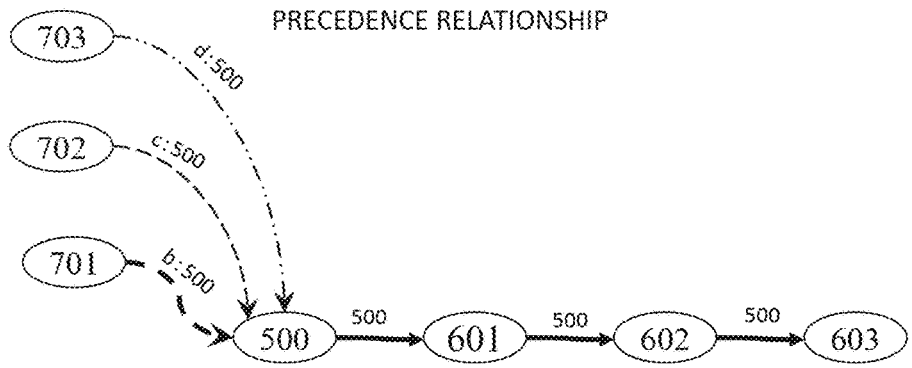
FIG. 10(a) is a diagram illustrating a list of the results of light ray scanning.
FIG. 10(b) is a diagram illustrating a directed graph having connection precedence relationship.

FIG. 10(b) is an example of a graph that is drawn on the basis of a connection precedence relationship list of FIG. 10(a) that represents a sequence of the connection between a fastening part and a fastening target part and the degree of obstruction in the action for disassembling the fastening part as described above. A part ID is represented on a node, the connection precedence relationship between parts is represented as a directed edge, the results of light ray scanning in the radial direction are illustrated by a solid line, and the results of light ray scanning in the axial direction are illustrated by a broken line, a dotted line, and a one-dot chain line in FIG. 10(b). Accordingly, it is possible to grasp that there is a case in which parts 601, 602, and 603 are disassembled by the disassembly of the fastening part 500 and parts 701, 702, and 703 cause obstruction in the disassembly of the fastening part 500.

Figure 11:
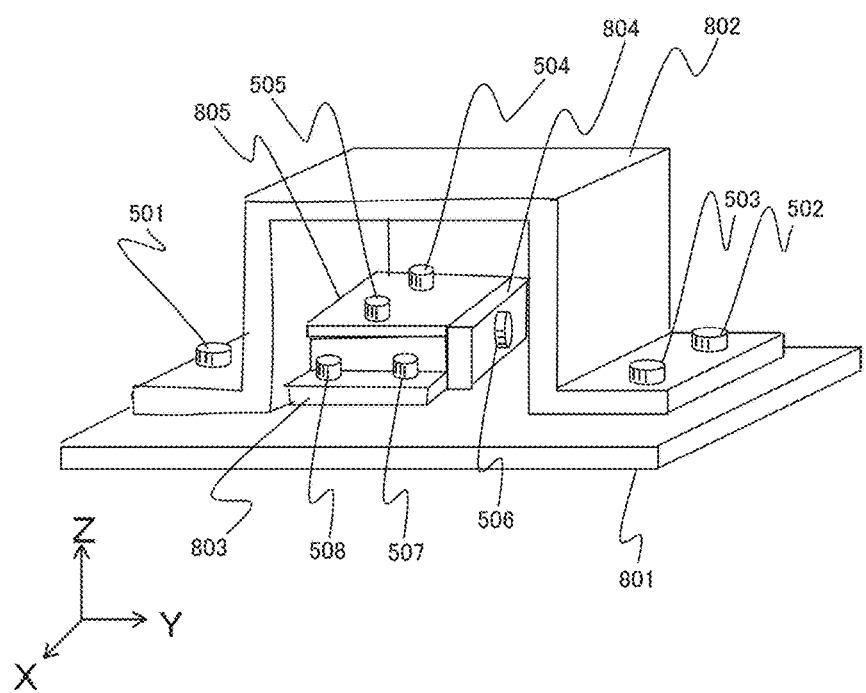
FIG. 11 is a diagram illustrating a 3D CAD model.

In processing for generating a disassembly unit and a disassembly sequence of Step S70 of FIG. 2, a disassembly unit and a disassembly sequence are deduced on the basis of the connection precedence relationship. Description will be made using an example of a 3D CAD assembly model illustrated in FIG. 11. Here, reference numerals given to parts of FIG. 11 are referred to as part IDs. In an assemblable product of FIG. 11, a part 803 comes into contact with a part 801 and is fastened in a negative Z-axis direction by screws 507 and 508. Further, a part 805 comes into contact with the upper surface of the part 803, a part 804 comes into contact with the side surface of the part 803, the part 805 is fastened in the negative Z-axis direction by screws 504 and 505, and the part 804 is fastened in a negative Y-axis direction by a screw 506. Furthermore, a part 802 comes into contact with the part 801, one side of the part 802 is fastened in the negative Z-axis direction by a screw 501, and the other side of the part 802 is fastened in the negative Z-axis direction by screws 502 and 503.

Figure 12:
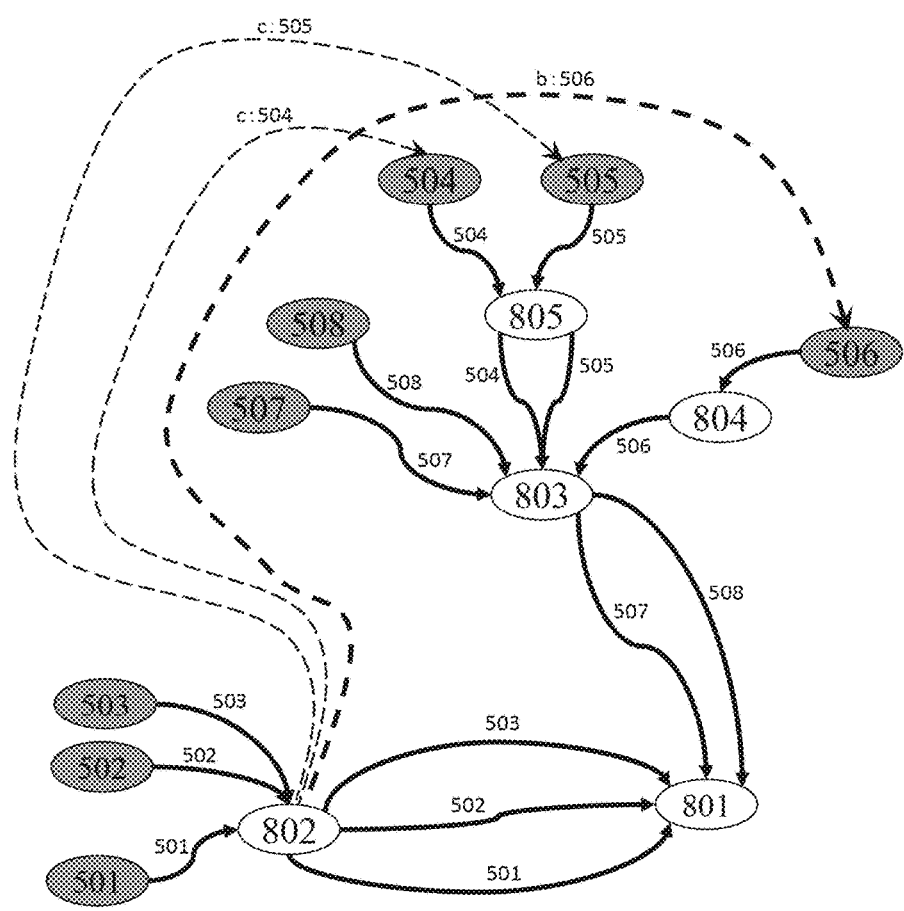
FIG. 12 is a diagram illustrating a connection precedence relationship graph of the model of FIG. 11.

A connection precedence relationship graph of the results of the analysis, which is performed by the processing up to Step S60, of the assemblable product model of FIG. 11 is illustrated in FIG. 12 as in FIG. 10. The fastening part 501 corresponds to a connection relationship of "part 802→801", the fastening parts 502 and 503 correspond to a connection relationship of "part 802→801", the fastening parts 504 and 505 correspond to a connection relationship of "part 805→803", the fastening part 506 correspond to a connection relationship of "part 804→803", and the fastening parts 507 and 508 correspond to a connection relationship of "part 803→801", which are illustrated in FIG. 12. Further, the part 802 is obstructive to the fastening part 506 by a distance of obstruction distinguishment b and the part 802 is obstructive to the fastening parts 504 and 505 by a distance of obstruction distinguishment c, which are illustrated in FIG. 12.

Figure 13:
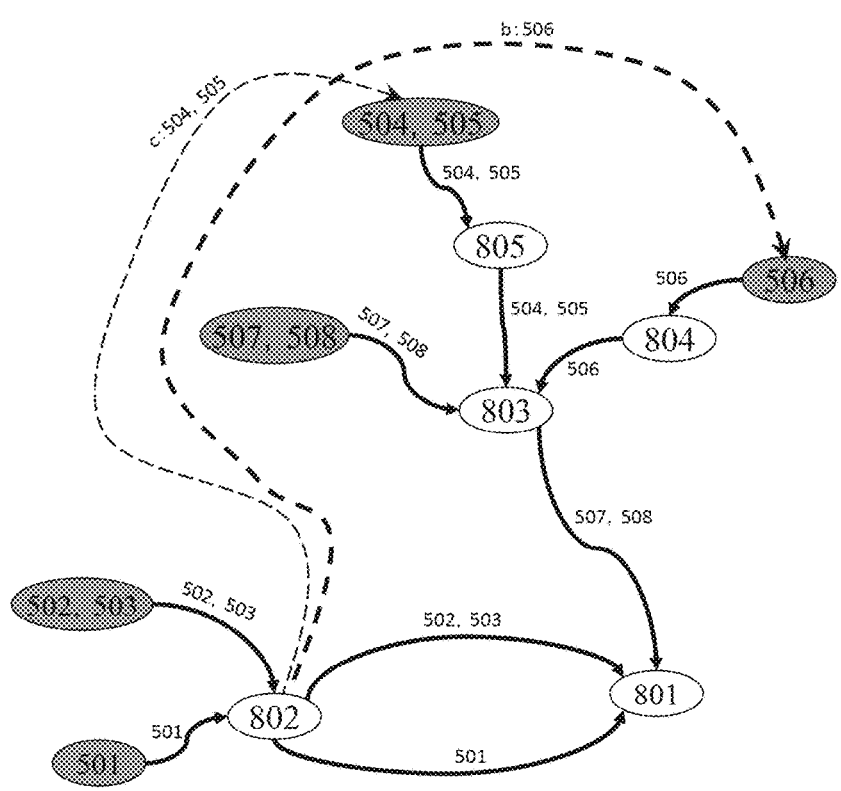
FIG. 13 is a diagram illustrating a connection precedence relationship graph in which parts corresponding to the same assembly direction and the same names as FIG. 12 are aggregated.

Here, the number of nodes of a graph is reduced by the aggregation of parts that have the same model name on the same 3D CAD model, parts that are assembled to the same surface in the same direction, and the same combinations of assembled parts. The result thereof is illustrated in FIG. 13. In this case, parts having the same obstruction distinguishment are objects to be aggregated. In FIG. 13 of the result of the aggregation, the numbers of nodes and edges of the graph of FIG. 12 are reduced and calculation processing becomes easy.

A disassembly sequence is deduced from FIG. 13. Basically, the disassembly sequence allows a part to be separated from a part to which an arrow goes. An arrow is a directed edge that connects part nodes; an arrow, which goes into the node, is described as an inner edge; and an arrow, which goes out of the node, is described as an outer edge. In the example of FIG. 13, nodes not including inner edges are the fastening parts 501, (502, 503), and (507, 508).

Figure 14:
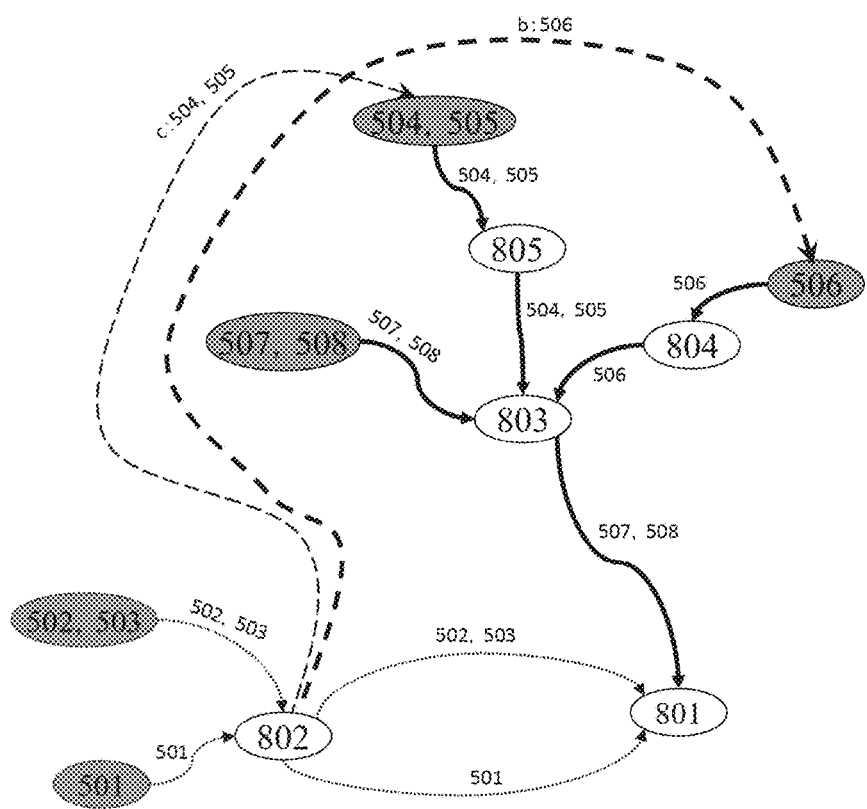
FIG. 14 is a diagram illustrating a state in which parts 501 to 503 of FIG. 13 are disassembled.

In this case, in regard to the sequence for disassembling parts, a condition rule for determining a disassembly sequence of, for example, "a part arranged on the upper side takes precedence" or "an upward disassembly action takes precedence" is previously defined in the disassembly sequence conditions 134 of FIG. 1, and a sequence is determined on the basis of the disassembly sequence conditions when determination cannot be made by only a connection precedence relationship. For example, when the parts 501 and (502, 503) are disassembled first, the connection relationship is cancelled and a state of FIG. 14 is made. In FIG. 14, disassembled part nodes and edges thereof are illustrated by thin dotted lines. Next, whether or not the parts 802 and 801 connected to the disassembled fastening parts can be disassembled is determined in this order. Meanwhile, the disassembly direction of the fastening part has been deduced during the analysis processing of a light ray, and the direction is referred to as the disassembly direction. In this case, a part including the arrow (the inner edge) means that there is a part to be disassembled previously. It can be determined that the part 802 not including an inner edge can be disassembled and the part 801 including an inner edge cannot be disassembled.

Next, the fastening part 506 and the fastening parts (504, 505), which are related to the part 802 with the obstruction distinguishments b and c, can be disassembled as the result of the disassembly of the part 802. In regard to the sequence for disassembling parts among a plurality of disassembly candidates that do not include inner edges as described above, a sequence is determined on the basis of the disassembly sequence conditions 134 of FIG. 1. Then, the fastening parts (504, 505) are disassembled on the basis of the conditions. As a result, since the connection relationship between the parts 805 and 803 is cancelled, a disassembly sequence and a disassembly sequence plan are sequentially determined in the same manner.

Figure 15:
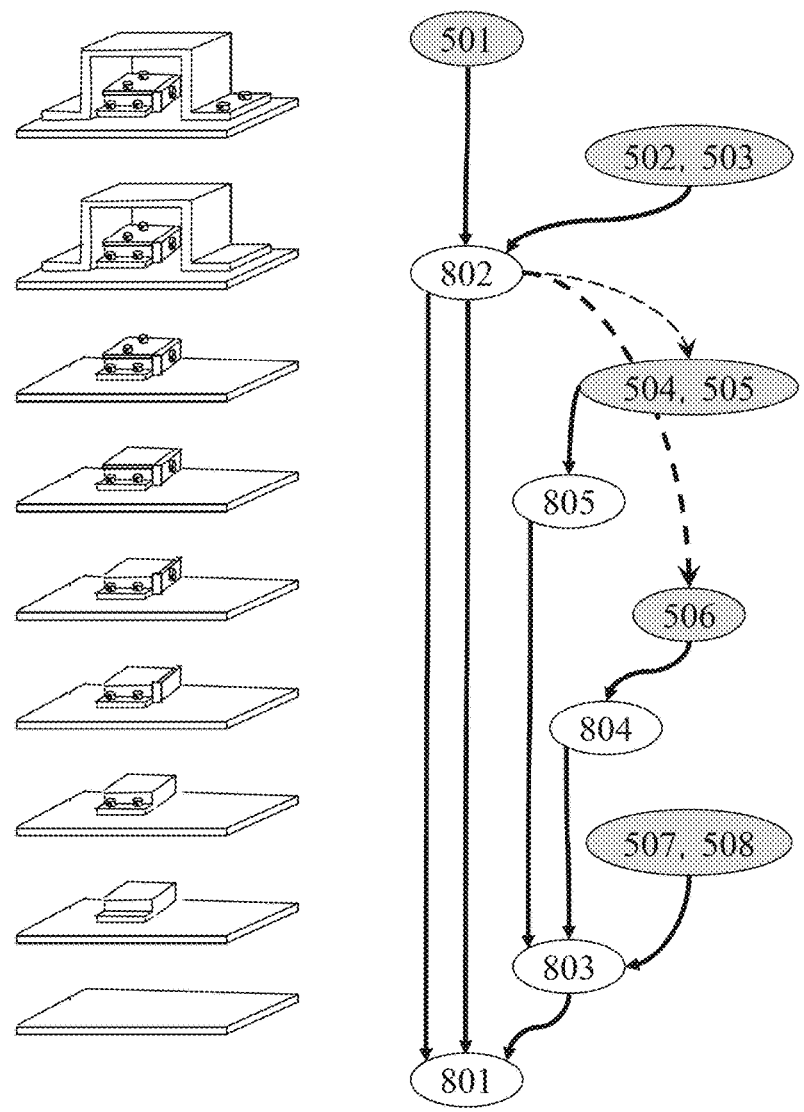
FIG. 15 is a diagram illustrating assembly steps that are generated from the connection precedence relationship graph of FIG. 13.

FIG. 15 is a diagram illustrating the result of the rearrangement of a connection precedence relationship graph according to a deduced disassembly sequence plan on the basis of a connection precedence relationship, which is generated by the method, and a disassembly image that is drawn for each disassembly sequence of the assemblable product model according to the graph. It is understood that a disassembly sequence can be correctly calculated from the deduction of a disassembly sequence based on the connection precedence relationship.

The basis of a method of deducing a disassembly sequence in the order of selection of part nodes, which do not include inner edges, has been described on the basis of the connection precedence relationship of FIG. 12. However, when the number of parts is large, a plurality of working steps need to be divided into classes.

Second Embodiment

A method of deducing assembly steps will be described with reference to FIGS. 16 to 18 as a second embodiment of the invention.

Figure 16:
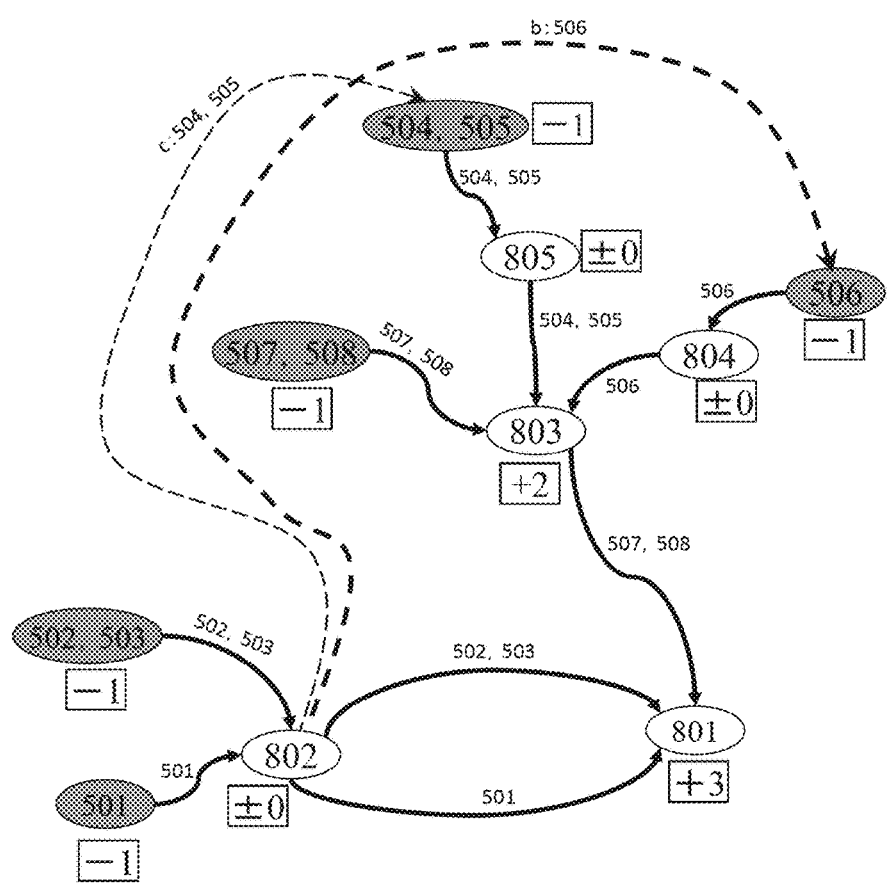
FIG. 16 is a diagram illustrating an example of the calculation of the number of arrows that go into and out of each node and are required to generate assembly steps.

FIG. 16 is a diagram in which the number of arrows going into and out of each part node, that is, a difference between the number of the inner arrows and the number of outer edges is calculated in the diagram of the result of the aggregation of FIG. 13 and the result thereof is illustrated at each node as a numerical value in a rectangular frame. Meanwhile, only the connection relationship in the radial direction, which is obtained from the light ray scanning, is used for the calculation of the number of arrows going into and out of each part node in FIG. 16. A part node where the number of arrows going into and out of has a negative value can be determined as a part that should be disassembled early, and a part node where the number of arrows going into and out of has a positive value can be determined as a part to which many parts are fastened and which serves as a base part. Even though the part nodes are sorted from this result and the determination of whether the inner edge is present or not, it is possible to deduce the same disassembly sequence as that of FIG. 15.

Further, a method of deducing a subassembly plan, that is, assembly steps by paying attention to a positive part node from the number of arrows, which go into and out of each node and are illustrated in FIG. 16, will be described. The parts 803 and 801, which have a positive value in FIG. 16, are parts of arrowheads to which a plurality of parts are connected, that is, can be determined as base parts. Accordingly, directed edges (507, 508) connecting a subassembly, which includes the part 803 as a base, to a subassembly, which includes the part 801 as a base, are grasped as total assembly work, and steps are divided from a part relationship between these base parts and the respective edges. The result thereof is illustrated in a rectangle of FIG. 17.

Figure 17:
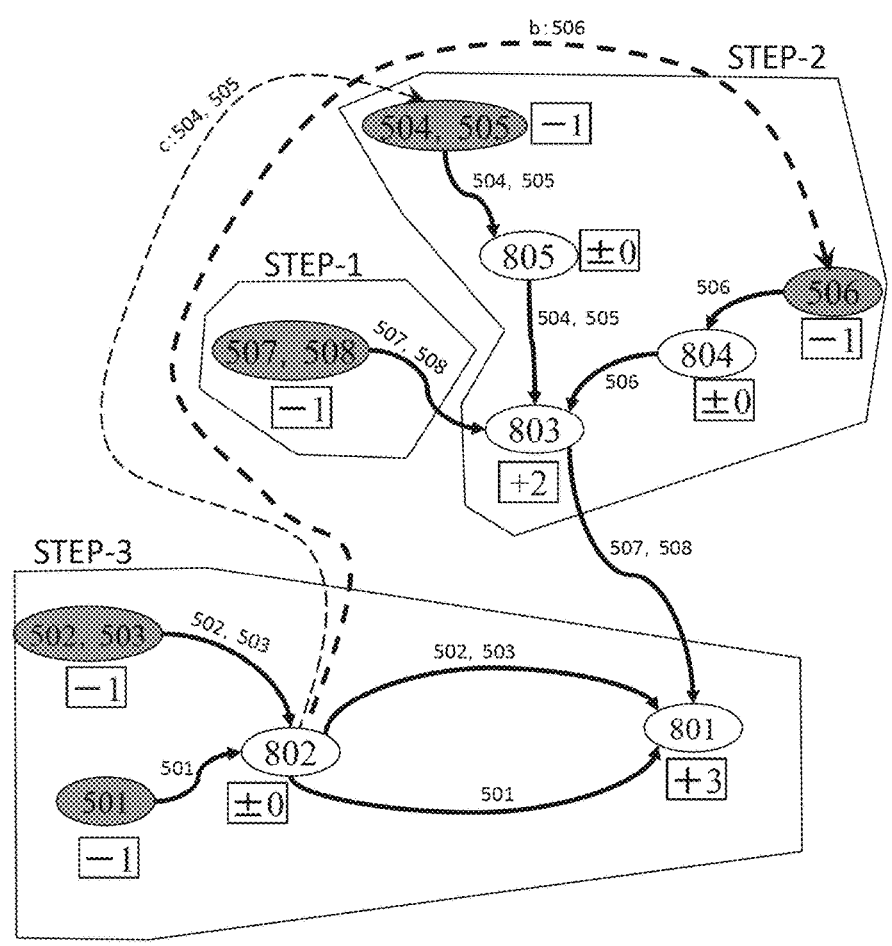
FIG. 17 is a diagram illustrating an example in which assembly steps are deduced on the basis of the number of arrows that go into and out of each node and are illustrated in FIG. 16.

Assembly steps (STEPs), which are illustrated by three rectangles as illustrated in FIG. 17, are broadly provided for assemblable product, and are sorted and numbered by a disassembly sequence from a connection precedence relationship (the direction of an arrow) of each group that is illustrated by the rectangle, so that a sequence including STEP-1, STEP-2, and STEP-3 illustrated in FIG. 17 is obtained. The flow of the disassembly sequence of the result is illustrated in FIG. 18.

Figure 18:
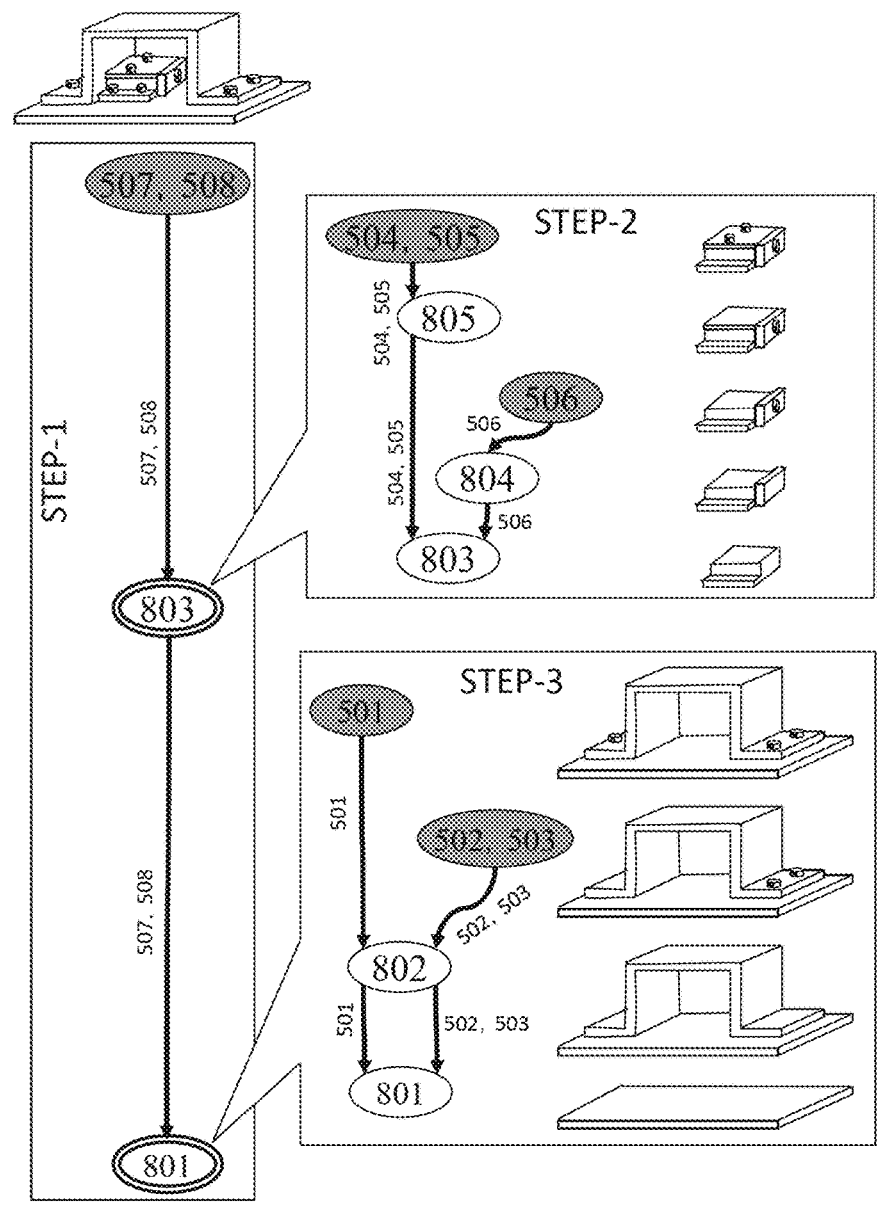
FIG. 18 is a diagram illustrating the deduced assembly steps of FIG. 17.

As illustrated in FIG. 18, the total assembly sequence of "the subassembly, which includes the part 801 as a base, and the subassembly, which includes the part 803 as a base, are assembled by the fastening parts 507 and 508", a connection relationship of the subassembly up to the base part 803, and a connection relationship of the subassembly up to the base part 801 are represented by connection precedence relationships in balloons, and assembly steps including subassembly work can be deduced.

However, the connection relationship, which is obtained from the light ray scanning in the axial direction and is illustrated in FIG. 16, is not considered in this method.

Third Embodiment

Next, the generation of assembly steps, which also consider the sequence of a part causing obstruction in the disassembly direction, will be described with reference to FIGS. 19 and 20 as a third embodiment of the invention.

In FIG. 17, the part 802 of STEP-3 causes obstruction with the distinguishment b during the disassembly of the fastening part 506, and causes obstruction with the distinguishment c during the disassembly of the fastening parts 504 and 505. For this reason, a part, which is obstructive to the disassembly of other parts, cannot be included in the subassembly that includes the part 801 as a base. Accordingly, processing for dividing steps on the outer edge side of a part node that is detected as a part causing obstruction in the plan of assembly steps of FIG. 17, that is, a part, which includes an outer edge of a broken line, is added. The result thereof is illustrated in FIG. 19.

Figure 19:
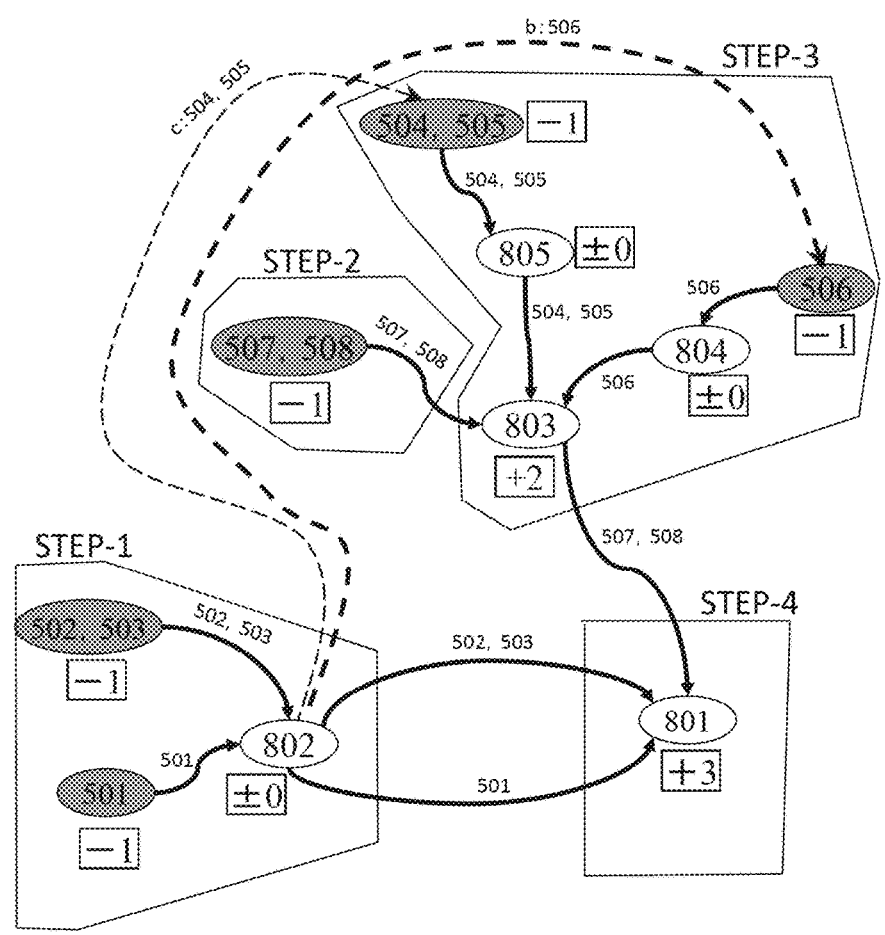
FIG. 19 is a diagram illustrating an example in which assembly steps in consideration of the sequence of parts detected as obstruction during disassembly in the connection precedence relationship graph of FIG. 13 are deduced.

FIG. 19 illustrates a result in which steps are divided into steps separate from the part 801 on the outer edge side, which is illustrated by a broken line, of the part 802 detected as an obstructive part in STEP-3 of FIG. 17. The sequence is renumbered on the basis of the divided step frame and a connection precedence relationship between the steps. FIG. 20 illustrates assembly steps that are generated on the basis of the result thereof.

Figure 20:
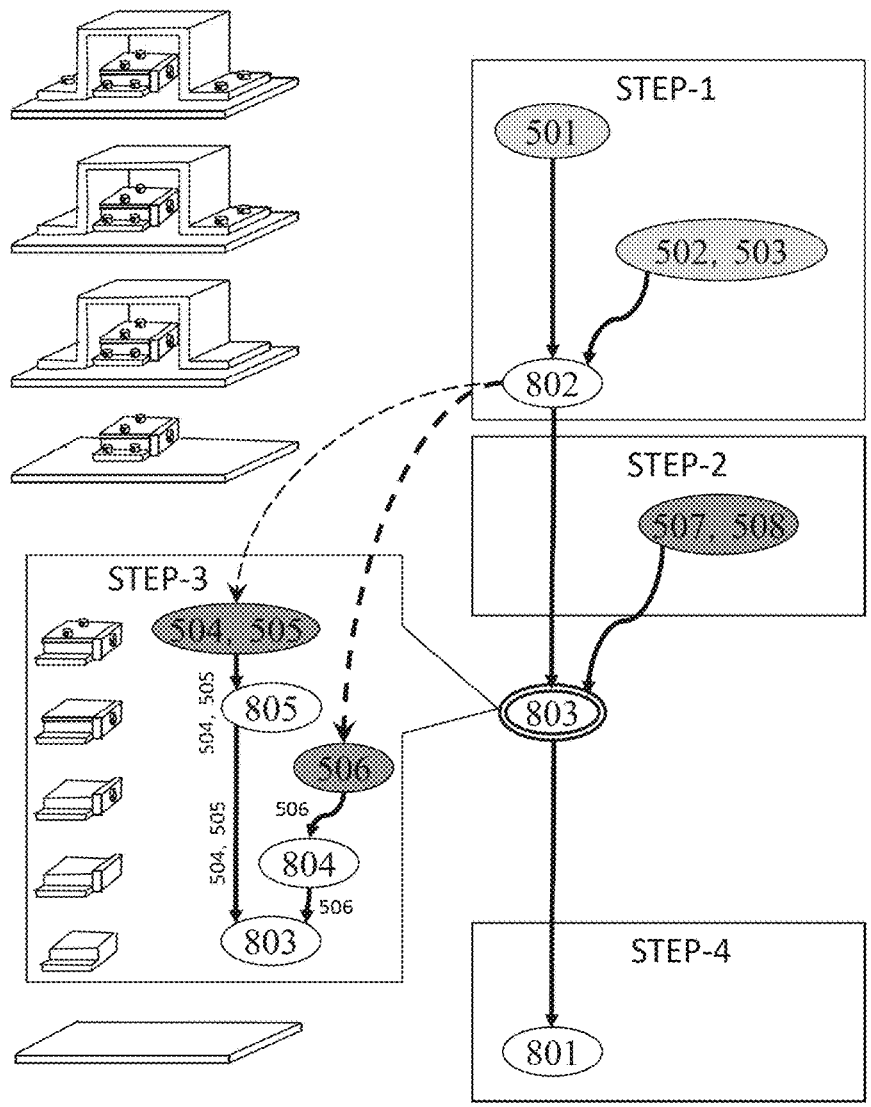
FIG. 20 is a diagram illustrating the deduced assembly steps of FIG. 19.

As illustrated in FIG. 20, assembly steps can be deduced on the basis of a sequence of "since the part 802 causes obstruction in the disassembly direction of the fastening parts 504, 505, and 506, the part 802 is disassembled first".

Fourth Embodiment

Figure 21:
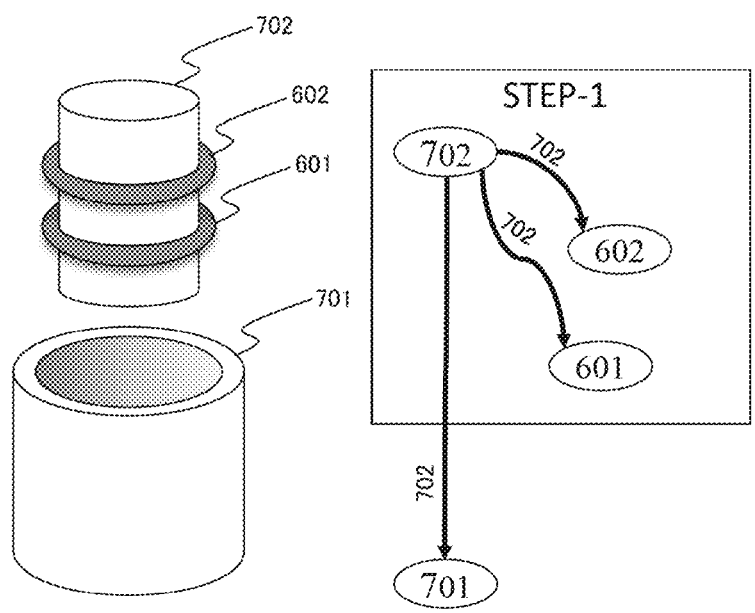
FIG. 21 is a diagram illustrating assembly step-determination rules that are individually defined.

In processing for reading a disassembly unit and a disassembly sequence, which are individually defined, of Step S80 of FIG. 2, a case, which cannot be determined in the connection precedence relationship obtained from light ray scanning, is previously defined and a disassembly unit and a disassembly sequence are deduced according to the rule. For example, a relationship between an O-ring and a part, which has a groove shape a coming into contact or interfering with the ring shape of the O-ring, is grasped from light ray scanning, but the O-ring is not calculated in the same manner as other cylindrical shapes and a sequence is deduced by a rule of an "O-ring is assembled immediately after the assembly of a part having an O-ring groove shape". FIG. 21 illustrates an example of an assemblable product in which a shaft on which two O-rings are mounted is inserted into a hollow part. Meanwhile, FIG. 21 illustrates a state in which the shaft on which the O-rings are mounted is separated upward from the hollow part. In this case, an assemblable product in which a shaft part 702 is fitted to O-rings 601 and 602 and is inserted into a cylindrical hole of the hollow part 701 is detected by light ray trace from a circular ring and light ray trace from a cylindrical hole as illustrated in FIG. 5, and a connection precedence relationship illustrated on the left side in FIG. 21 is obtained. In this case, the parts 601 and 602 are determined as O-rings from the classification of the part type of Step S20 of FIG. 2, and a sequence for assembling the O-rings with the shaft part first in the above-mentioned rule that is individually defined in Step S80 of FIG. 2 is obtained.

For example, when the part type is a nut, a sequence is deduced by a rule of "a nut is assembled after the completion of the fastening of a portion, which is opposite to the end portion of the nut, of a part including a screw portion that is to be fastened by the nut" as another rule that is individually defined. Exception processing based on a rule, which is previously defined, is performed on the basis of a connection relationship that is detected from the part type and light ray trace as described above.

Fifth Embodiment

In processing for generating an assembly graph of Step S90 of FIG. 2, data representing a relationship between parts are created by a graph in which a node (joint) denotes a part and an edge (side) denotes an adjacency relationship, from adjacency relationship information between parts of 3D CAD model information that is acquired in Step S10.

Figure 22:
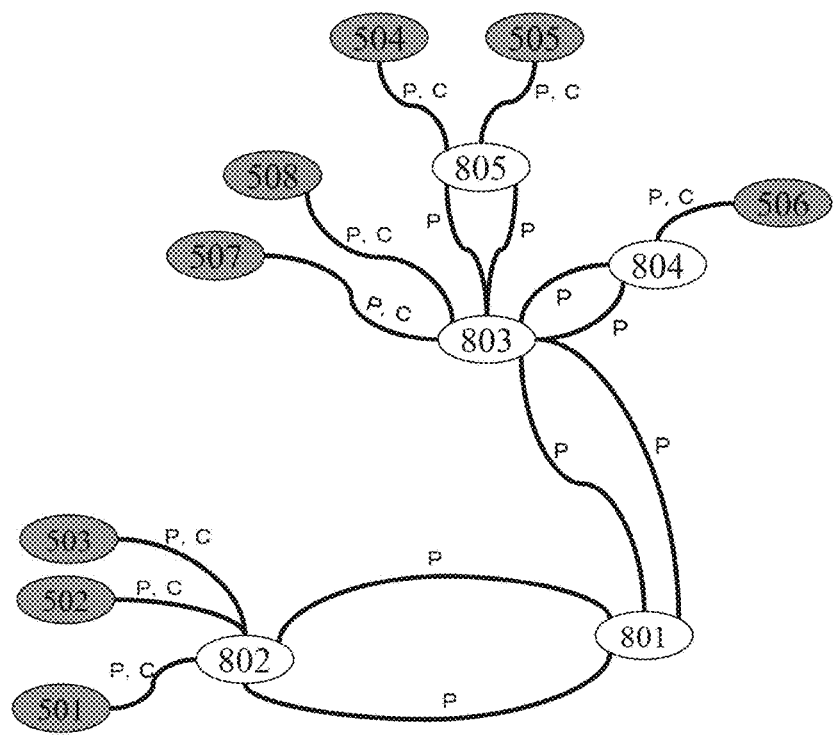
FIG. 22 is a diagram illustrating an example of an assembly graph.

FIG. 22 is an example of an assembly graph that is generated from an adjacency relationship between parts of the 3D CAD model illustrated in FIG. 11. The assembly graph is a graph in which a node denotes a part and an edge denotes an adjacency relationship between parts, and an edge is generated for each type of the adjacency relationship (for each type of an adjacent direction or an adjacent surface). Further, flat surface restriction (surface coincidence) and cylinder restriction (coaxial) are broadly distinguished, and flat surface restriction is denoted by P and cylinder restriction is denoted by C on the edges of FIG. 22. Furthermore, although not described in FIG. 17, a plurality of part may be denoted by one node as in the connection precedence relationship graph in a case in which the model name, the assembly direction, and the adjacency relationship are the same (the adjacent direction or the adjacent surface is the same). The generated assembly graph is stored in the storage section 130.

In the generation of an assembly sequence, an assembly direction, and an assembly action of Step S100 of FIG. 2, a disassemblable direction is generated on the basis of the assembly graph 136 generated in Step S90, and a disassembly direction and a disassembly sequence are generated by, for example, a method of generating an assembly sequence disclosed in Patent Document 3 (JP 2012-14569 A), and an assembly sequence and an assembly direction are deduced from the reverse conversion of the disassembly sequence and the disassembly direction.

Figure 23:
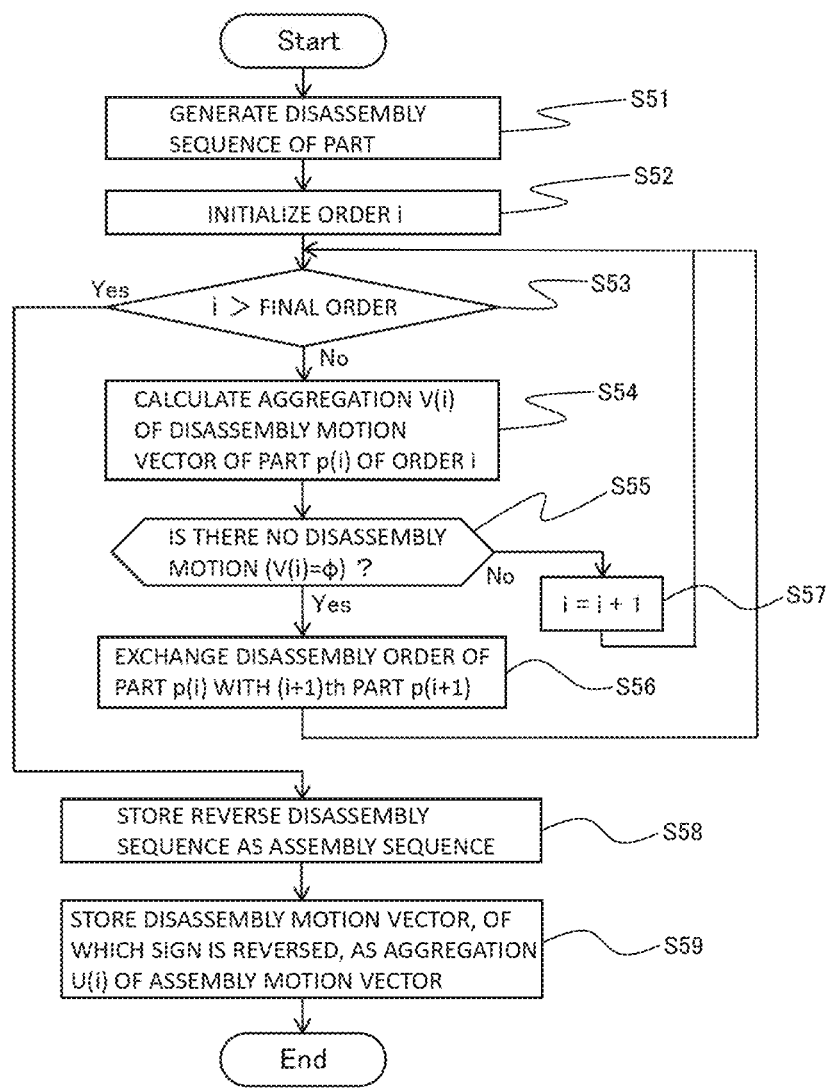
FIG. 23 is a flowchart illustrating a processing flow of a disassembly sequence, the deduction of a disassembly motion and an assembly sequence, and the conversion to an assembly action.

FIG. 23 is an example of a flowchart illustrating processing up to processing for generating an assembly sequence and an assembly direction. First, a disassembly sequence and a disassembly direction are generated from an assemblable product model of 3D CAD, and an assembly sequence and an assembly direction are generated by the reverse of the sign of a vector of a disassembly motion in a reverse order of the disassembly sequence. In this case, results obtained from the above-mentioned connection precedence relationship are used as a draft plan of the disassembly sequence and the disassembly unit.

Here, a plurality of plans may also be deduced in the generation of the assembly sequence. Accordingly, the plans are also subjected to the above-mentioned all processing.

In the check of where unconnected parts are present or not of Step 101 of FIG. 2, it is possible to determine that other parts are connected by the fastening parts 501, 502, 503, 504, 505, 506, 507, and 508 in the connection precedence relationship of FIG. 12 and the relationship of the assembly graph of FIG. 22 when information about all assembly work, such as a screw of a standard part, is modeled as in FIG. 11. In this case, it is determined that there is no connection leakage, and the result of the assembly sequence deduced in the processing is output in the processing for outputting the result of the calculation of an assembly sequence of Step S110 of FIG. 2. In this case, 3D CAD information used during the calculation, and an assembly graph and a directed graph having the generated connection precedence relationship may be output together.

Sixth Embodiment

Meanwhile, a standard fastening part or work information is not modeled in the case of a large-sized assemblable product model or an assemblable product model of a conceptual design step. An example thereof will be described with reference to FIG. 24 or later.

Figure 24:
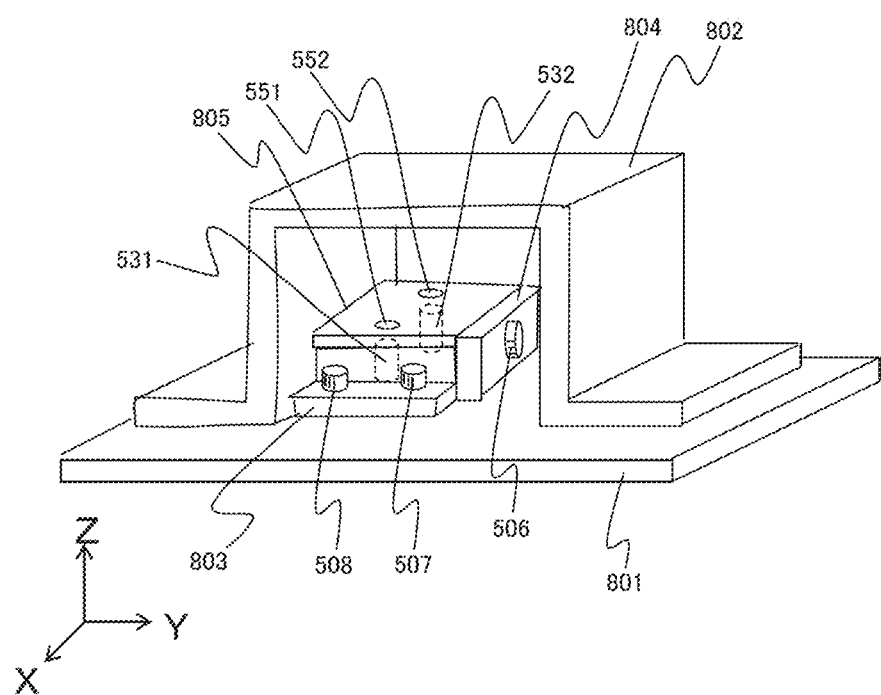
FIG. 24 is a diagram illustrating an assemblable product model of which information about connected portions is deficient.

FIG. 24 is a diagram illustrating an assemblable product model in which some connected portions are removed from the assemblable product model of FIG. 11, and the detection of unconnected parts, and the addition of work contents and a work sequence will be described in FIG. 24. In the model of FIG. 24, the part 802 comes into surface contact with the part 801 at two portions. Further, in the parts 805 and 803, flat surface restriction for part 803 is defined as assembly restriction when a designer arranges the part 805, but other restriction is not defined. The parts 501, 502, 503, 504, and 505 are removed from an assembly graph representing the adjacency relationship between parts of FIG. 22. Further, the part 805 includes two cylindrical holes 551 and 552, the part 803 also includes two cylindrical holes 531 and 532, the cylindrical holes 551 and 531 are adjacent to each other, and cylindrical holes 552 and 532 are adjacent to each other.

Figure 25:
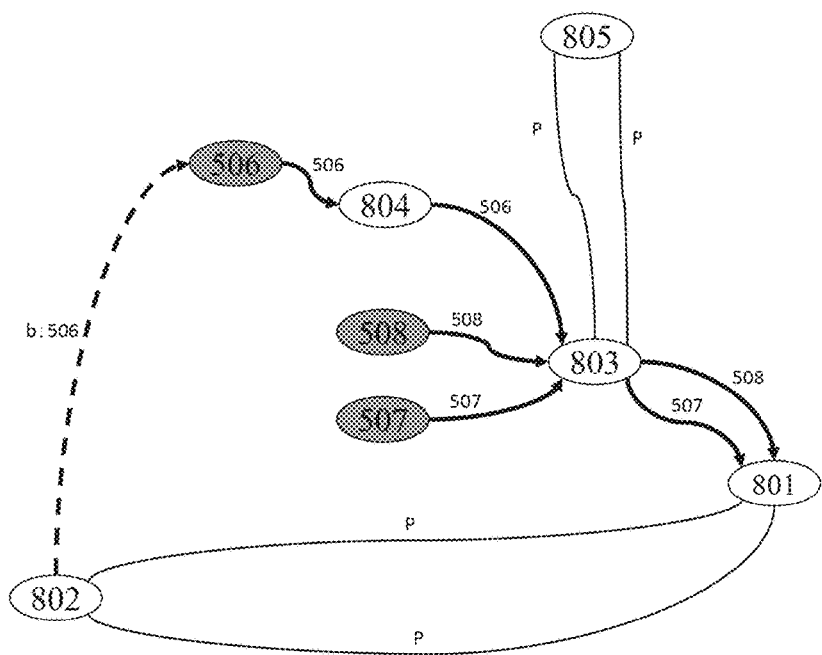
FIG. 25 is a diagram illustrating an integrated assembly graph in which a connection precedence relationship and an adjacency relationship generated on the basis of the assemblable product model of FIG. 24 are integrated with each other.

FIG. 25 illustrates an assembly graph in which the adjacency relationship and the connection precedence relationship of the assemblable product of FIG. 24 are integrated with each other. Meanwhile, when connection precedence edges are present on adjacent edges of the assembly graph of FIG. 22, adjacent edges of FIG. 22 are omitted. From the integrated assembly graph, it is understood that the part 803 is fastened to the part 801 by the fastening parts 508 and 507 and the part 804 is fastened to the part 803 by the fastening part 506. Meanwhile, it is detected that the parts 805 and 803 and the parts 802 and 801 have flat surface restriction but are not connected to each other. As described above, in Step 101 of FIG. 2, unconnected parts are detected from the integrated assembly graph on the basis of the connection precedence relationship and the adjacency relationship between parts.

Figure 26A:
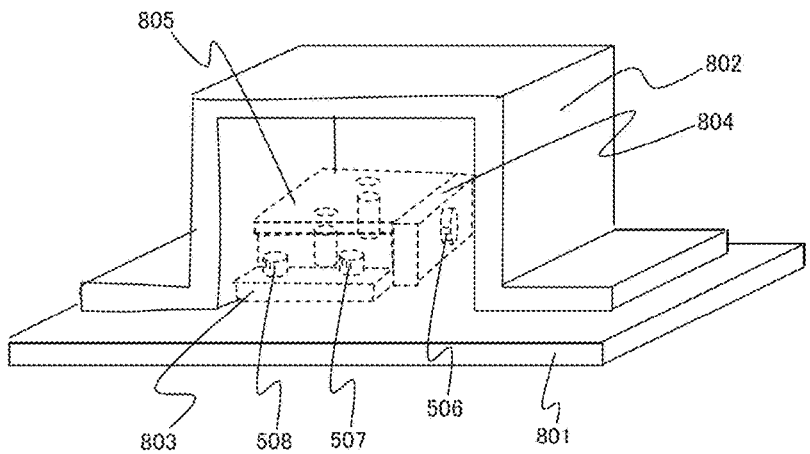
FIG. 26(a) is a diagram illustrating a 3D display.
Figure 26B:
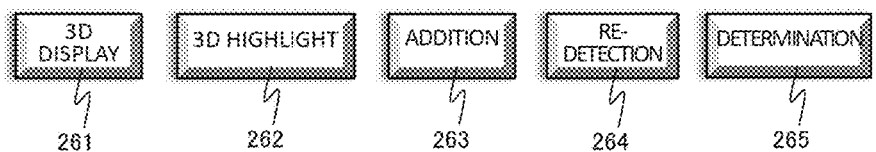
FIG. 26(b) is a diagram illustrating a list of unconnected parts.

FIGS. 26(*a*) and 26(*b*) illustrate the results of the detection of unconnected parts and an example of a screen that is used to add work contents and a work order. The results of the detection of unconnected parts using the relationship analysis of the assemblable product model are output in the form of a table. Part IDs and part names of unconnected parts, part IDs and part names of adjacent parts, and an adjacency relationship (restriction relationship), which can be grasped, are output to the table.

Nos. 1 and 2, which are displayed on the screen of FIG. 26(*b*), illustrate that a base part having a part ID 801 and an adjacent cover part having a part ID 802 are adjacent to each other on a plane. In this case, when a "3D display" button 261 is operated in a state in which Nos. 1 and 2 are selected on the list, a state in which only a selected target part is displayed in the 3D model is displayed. Other part models, which are not displayed, are displayed in FIG. 26(*a*) by a dotted line. As a method of displaying other part models, after one or more designated part IDs are sent from an external GUI in the programming using an API of 3D CAD, the designated models may be highlighted on 3D CAD, only the designated models may be displayed, models other than the designated models may be excluded from objects to be displayed, or the color of the designated models may be changed into a translucent color. A "3D display" button 261 and a "3D highlight" button 262 among them are arranged in examples of operation buttons.

Meanwhile, the columns of the work contents and the work order of the list of FIG. 26(*b*) display results that are estimated from the part types, the shape/dimension conditions of adjacent surfaces, and the like of adjacent parts with reference to a work estimation table.

FIG. 27 illustrates the work estimation table. The table stores an adjacency relationship, the combinations of types of adjacent parts, the conditions of the shapes and dimensions to be determined, work contents that are output as the results of estimation, and the conditions of generation of a work order. For example, the case of FIG. 26 corresponds to the contents of No. 2, "welding" is output as work contents, and "802→801" is output as the work order, according to the conditions of generation of the work order.

Further, in examples of Nos. 3 and 4 of FIG. 26, only flat surface restriction is provided as assembly restriction, but flat surfaces and cylindrical holes, which can deduce the fact that the cylindrical holes 531 and 532 of the part 803 are adjacent to the cylindrical holes 551 and 552 of the part 805, respectively, are adjacent to each other from information about the positions and postures of cylindrical holes that are detected during the generation of a connection precedence relationship of the model of FIG. 24. The correspondence to "adjacent cylindrical holes are coaxial and the diameters of holes and the diameters of female screws are for M4" described in the shape/dimension conditions of No. 3 of FIG. 27 is determined from this adjacency relationship, work for fastening a M4 screw is output as work contents, and the result, which is estimated as "screw→805→803" according to the conditions of generation of the work order, is output as a work order. Meanwhile, the result of the length of a screw hole, which is estimated from the value of a total length of a plurality of adjacent cylindrical holes, is output in the case of the estimation of the fastening of the screw (M4L50).

Figure 28A:
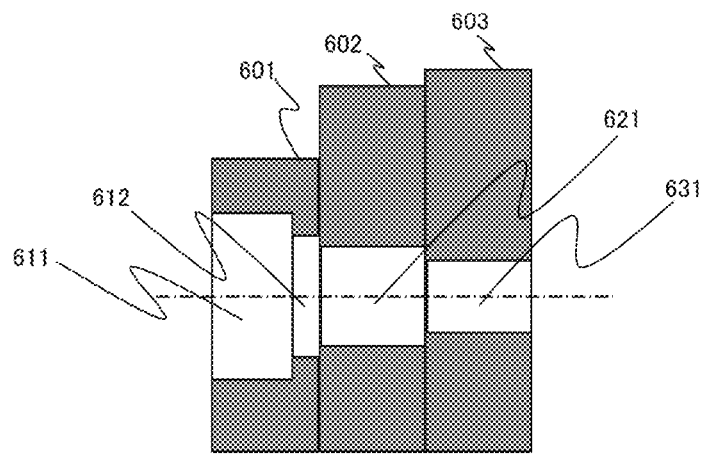
FIG. 28(a) is a diagram illustrating a assemblable product model in which screw is not modeled.
Figure 28B:
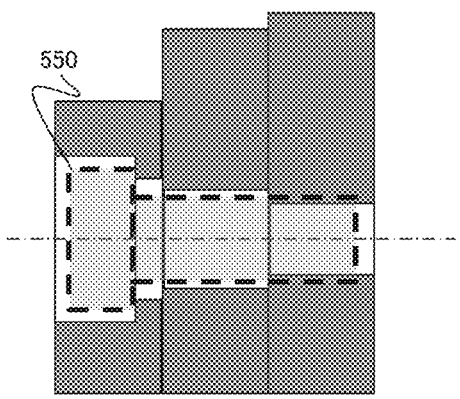
FIG. 28(b) is a diagram illustrating a diagram illustrating screw that is estimated from adjacency relationship of position and posture of cylindrical hole.
Figure 28C:
FIG. 28(c) is a diagram illustrating a directed graph having connection precedence relationship based on estimated screw.

An example of a method of estimating a fastening relationship based on the adjacency relationship between the cylindrical holes will be described with reference to FIG. 28 and a flowchart of FIG. 29. The detection of unconnected parts is performed in Step S1011 of FIG. 29. For example, a cross-sectional view of an assemblable product model in which a screw is not modeled and the parts 601, 602, and 603 is illustrated in FIG. 28(*a*), but it is determined that the parts 601, 602, and 603 are not connected by the above-mentioned processing.

The acquisition of characteristic shapes (a cylindrical hole and the like) of the unconnected parts is performed in Step S1012 of FIG. 29. For example, the part 601 includes cylindrical holes 611 and 612, the part 602 includes a cylindrical hole 621, and the part 603 includes a cylindrical hole 631. The positions and postures of these cylindrical holes are detected in Step 30 of FIG. 2; part IDs, shape IDs, the types of shapes, center point coordinate values, axial vectors, and dimensional attributes are grasped as in the list illustrated in FIG. 5; and information about these is acquired.

Characteristic shapes of which axial vectors have the same direction and a vector between the centers has the same direction as the axial vectors, that is, the characteristic shapes arranged on the same axis are extracted and grouped in Step S1013 of FIG. 29. In the case of FIG. 28, the cylindrical holes 611, 612, 621, and 631 are grouped and n groups are created in a target model.

In Step S1014 of FIG. 29, the following processing is performed on the aggregations of the respective grouped characteristic shapes.

When the distance between the centers of the characteristic shapes is equal to or smaller than the value of the sum of a half ($L_1/2$, $L_2/2$) of the length of each of adjacent characteristic shapes and the value of a predetermined clearance in Step S1015 of FIG. 29, it is determined that the characteristic shapes are the shapes of adjacent portions (Step S1016). When the distance between the centers of the characteristic shapes has a value equal to or larger than the value of the above-mentioned sum, it is determined that the aggregations of the grouped characteristic shapes are not adjacent to each other (not fastened by a fastening part) and a process proceeds to Step S1021 and the processing of the next group is performed.

In Step S1017, fastening part candidates are narrowed down from the minimum diameter among two or more characteristic shapes that are grasped as portions having adjacent characteristic shapes in Step S1016. Specifically, fastening part candidates are narrowed down to fastening parts of which the diameter of a male screw is equal to or smaller than the minimum diameter.

In Step S1018, among the fastening part candidates, which are narrowed down in the above-mentioned step, fastening part candidates, of which the diameter of a head of the fastening part candidate is larger than the minimum diameter of a part provided at an end portion on the axial vector of the part groups that are determined as adjacent groups, are narrowed down. Specifically, it is determined whether or not the diameter of the head of the fastening part, which is narrowed down in the above-mentioned step, is larger than the minimum diameter of a part provided at the end portion. This is performed for two parts provided at both end portions. When the diameter of the head of a fastening part is smaller than the minimum diameter of the part provided at the part, the part provided at the end portion is excluded from parts, which are to be fastened, of a part group that includes adjacent parts (Step 1019). The processing is repeatedly performed for the other adjacent parts except the part.

In Step S1020, fastening part candidates are output to an unconnected part list illustrated in FIG. 26(*b*) as work contents.

In Step S1022, the results of the processing of all groups of unconnected parts, which are detected in the assemblable product model, are output as the unconnected part list.

Since it is possible to grasp the positions and postures of the cylindrical holes and a part group of which adjacent parts and parts to be fastened are narrowed down, it is possible to specify a fastening part. The diameter and length of a screw, which are estimated, are output in work contents of Nos. 3 and 4 of the unconnected part list of FIG. 26(*b*).

A screw 550 can be estimated as in FIG. 28(*b*) by the flowchart illustrated in FIG. 29.

Further, in Nos. 1 and 2 of the table of FIG. 26(*b*), a cylindrical hole is not modeled and an example of only surface restriction is provided. In this case, an example in which "welding" of No. 2 is estimated according to the work estimation table of FIG. 27 is illustrated, and examples in which there is adjacency relationship information are illustrated in Nos. 1 to of FIG. 26(*b*). Other examples of a method of adding a connection relationship will be described with Nos. 5 and 6 of FIG. 26(*b*).

No. 5 of FIG. 26(*b*) is an example in which a part not represented in a 3D CAD model is added. Only an adjacency relationship between flat surfaces is detected from the parts 802 and 801 as in Nos. 1 and 2. However, when a row is added by an "addition" button 263 in a case in which a press-fit pin is added between these parts although not represented in 3D CAD, a new part ID is displayed and a part name is input to the row. Regardless of an adjacent part ID, an adjacent part name, and whether or not there is an adjacency relationship, work contents and a work order are directly input and defined. As described in the row of No. 5, a press-fit pin 903 is stored as a precedence relationship of "part 802→part 801".

An example, which is represented in a 3D CAD model and to which a connection relationship is added, is illustrated in No. 6 of FIG. 26(*b*). For example, in a case in which it becomes clear that the delivery of a part is delayed from an initial schedule, assembly steps deduced from a geometric adjacency relationship of an assemblable product are not used and need to be changed in consideration of the delay of the delivery of the part. Accordingly, a work order of assembly work of the part is added as in, for example, No. 6 by the "addition" button 263 of FIG. 26(*b*) regardless of whether or not there is an adjacency relationship.

Meanwhile, the work contents and the work order of FIG. 26(*b*), which are automatically estimated, may also be edited as necessary after a model is checked by the "3D display" button 261 and the like. Further, there is a movable part as an example defined as a part that has an adjacency relationship but "is not connected". In this case, a part is defined as "not connected (movable part)" in work contents, and a process proceeds to the next step.

Leakage is checked by a "re-detection" button 264 after the part is defined as described above, and a connection precedence relationship is deduced on the basis of conditions between two parts that are determined according to the work contents and the work order defined on the basis of estimated results (Step S60 of FIG. 2).

Figure 30:
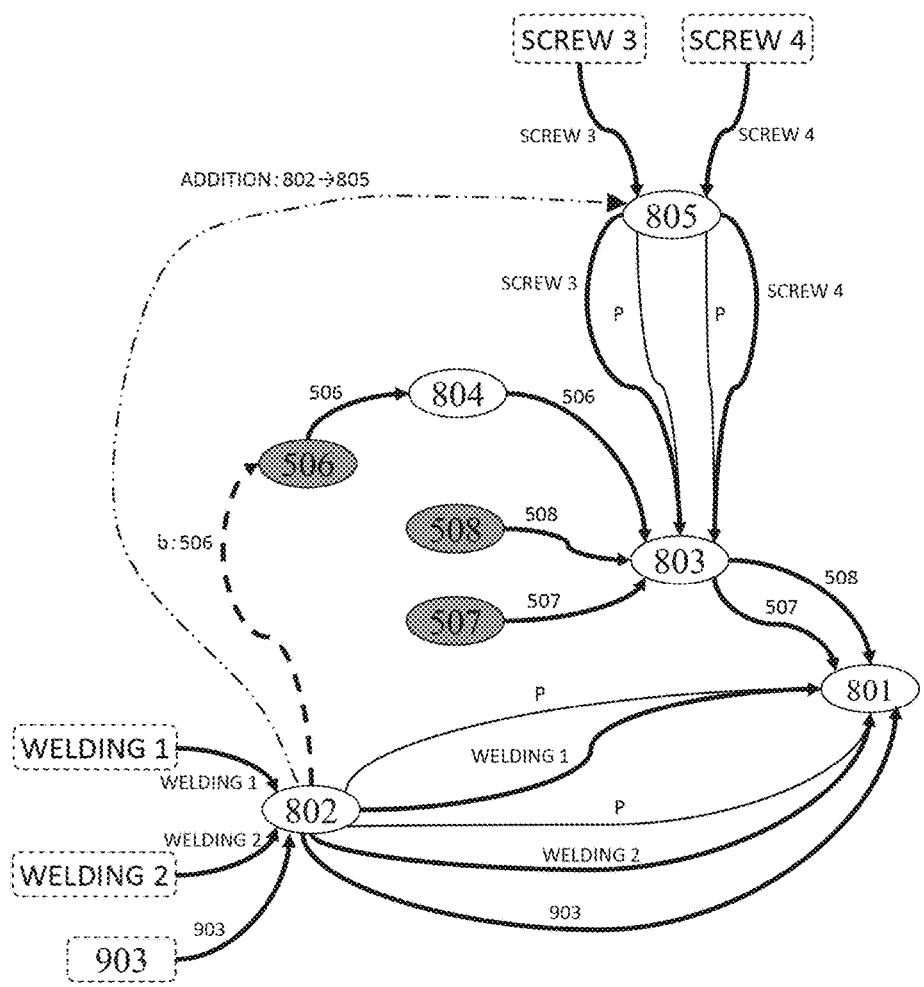
FIG. 30 is a diagram illustrating an integrated assembly graph in which a connection precedence relationship and an adjacency relationship additionally generated on the basis of the list of FIG. 26 are integrated with each other.

FIG. 30 illustrates examples of a connection precedence relationship and an adjacency relationship in the case in which the contents of the list illustrated in FIG. 26(*b*) are determined (a "determination" button 265 is pushed). FIG. 30 is an assembly graph in which a connection precedence relationship is added to the graph of FIG. 25 from the contents of the list of FIG. 26(*b*). Nodes, which are newly added to the part nodes illustrated by ellipses of a solid line, are illustrated by rectangular frames of which corners are rounded. Nodes of "welding 1" and "welding 2" are represented by a directed edge "welding 1" and a directed edge "welding 2" as in the work orders of Nos. 1 and 2 of FIG. 26(*b*). Nodes of "screw 3" and "screw 4" are represented by a directed edge "screw 3" and a directed edge "screw 4" as in the work orders of Nos. 3 and 4 of FIG. 26(*b*). A node of the press-fit pin "903" is represented by a directed edge "903" as in the work order of No. 5 of FIG. 26(*b*). Further, "addition: 802→805", which is represented by a directed edge of a two-dot chain line, is generated on the basis of No. 6 of FIG. 26(*b*).

When parts and work, which are not represented on 3D CAD, are estimated from an adjacency relationship of other parts, and work orders are added without being drawn in 3D CAD from other conditions, the graph of a connection precedence relationship can be generated and output as in a case in which work orders are defined and drawn in 3D CAD.

The generation of an assembly sequence, an assembly direction, and an assembly action is performed again from the generation of the effective graph of a connection precedence relationship on the basis of the work contents and the work orders that are added as described above (Step 102 of FIG. 2), and is repeated until unconnected parts are not present. Accordingly, it is possible to generate assembly steps and an assembly sequence including parts, work, and other conditions that are not represented on 3D CAD.

Figure 31:
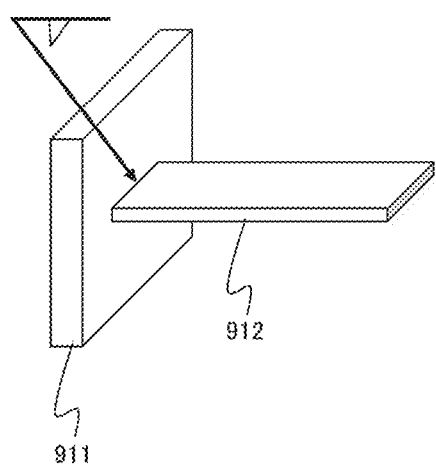
FIG. 31 is a diagram illustrating an example of 3D annotation information.

Meanwhile, FIGS. 26, 27, 28, 29, and 30 illustrate examples in which welding work is estimated from adjacent surfaces and the fastening parts are estimated from the adjacency relationship between the cylindrical holes. 3D annotation information, which is represented by balloons or arrows of designed instruction information arranged on 3D CAD, may be used in addition to this method. Specifically, when a welding sign denoted by "→" is provided on the adjacent surface between parts 911 and 912 as 3D annotation information as illustrated in FIG. 31, it is known from the welding sign that welding is performed on the upper front side in FIG. 31. When the adjacency relationship of a surface and a ridge between the parts, which are positioned at an arrowhead, is analyzed on 3D CAD, the area of the adjacent surface and the length of the ridge can be deduced. Accordingly, when specific work contents can be determined from information about a sign or a character string represented as the 3D annotation information and a welding length is detected from the ridge of the surface of the arrowhead, it can be automatically determined that the ridge is joined by welding work. Likewise, a condition of a work order different from the shape of No. 6 or the like of FIG. 26 may be added as 3D annotation information.

Further, for example, when two or more parts are present for the ridge in the case of the welding sign, work order of the work for welding the part may be estimated from the size of the part or the stability of the posture of the part. For example, an order of work for welding the part 912 to the part 911 is generated in the case of FIG. 31.

As described above, there are provided processing sections that detect unconnected parts, estimate a fastening part from the position and posture of a portion included between the detected parts, and check and additionally determine estimated work contents and an estimated work order. Accordingly, it is possible to define a partial work order of a standard part or a model, which is not subjected to annotation work, such as a large-sized assemblable product model or an assemblable product model of a conceptual design step. Accordingly, it is possible to generate assembly steps and an assembly sequence on the basis of an assembly graph that is generated from a geometric shape and a work order that is additionally defined.

Meanwhile, the invention is not limited to the above-mentioned embodiments, and may include various modifications. For example, the above-mentioned embodiments have been described in detail to allow the invention to be easily understood, and the invention is not limited to an embodiment that necessarily includes all described structures. Some of the structures of a certain embodiment can be replaced with structures of the other embodiment, and the structures of other embodiments can also be added to the structures of a certain embodiment. Further, other structures can be added to, removed from, replaced for some of the structures of a certain embodiment.

Furthermore, a portion or all of the above-mentioned structures, functions, processing sections, and the like may be designed in, for example, an integrated circuit, so that the above-mentioned structures, functions, processing sections, and the like may be realized by hardware. Moreover, a processor may interpret and execute programs for realizing the respective functions, so that the respective functions may be realized by software. Information about programs, which realize the respective functions, tables, files, and the like can be stored in recording devices, such as a memory, a hard disk, or an SSD (Solid State Drive), or a recording medium, such as an IC card, an SD card, or a DVD.

REFERENCE SIGNS LIST

100: apparatus for generating assembly sequence
110: control section
111: 3D CAD model information acquiring section
112: part type classifying section
113: characteristic shape detecting section
114: assembly graph generating section
115: section for generating assembly sequence, assembly direction, and assembly action
116: unconnected part detecting section
117: work order adding section
120: connection precedence relationship generating section
121: section that detects part present in radial direction of characteristic shape (cylindrical hole and the like) and detects part present in axial direction of detected part
122: section that generates directed graph having connection precedence relationship
123: section that generates disassembly unit and disassembly sequence plan.
130: storage section
131: 3D CAD model information
132: part type information
133: analysis calculation program/calculation conditions
134: disassembly sequence conditions/disassembly unit conditions
135: connection precedence relationship graph
136: assembly graph
137: assembly sequence data
140: input section
150: display section
160: communication section
200: 3D CAD device
210: network
261: "3D display" button
262: "3D highlight" button
263: "addition" button
264: "re-detection" button
265: "determination" button

The invention claimed is:

1. An apparatus for generating assembly steps and an assembly sequence for sequentially assembling a plurality of parts of an assemblable product, the apparatus comprising:
an information acquiring section that extracts, from a three dimensional computer-aided design (3D CAD) model, information about a part attribute, part arrangement, and an adjacency relationship with other parts for each of the plurality of parts;
a part type classifying section that classifies types of parts from information about the 3D CAD model;
a characteristic shape detecting section that detects designated characteristic shapes from the 3D CAD model;
a part detecting section that detects a part present in a radial direction of each of the detected characteristic shapes and detects a part present in an axial direction of the detected part in the 3D CAD model;
a section that generates a directed graph, in which a node denotes a part and a directed edge denotes a connection precedence relationship between parts and which has a connection precedence relationship, on the basis of results of the detection of the parts;
a disassembly sequence plan generating section that generates a disassembly unit and a disassembly sequence plan on the basis of the connection precedence relationship;
an assembly graph generating section that generates an assembly graph, in which a node denotes a part and an edge denotes an adjacency relationship and which represents a relationship between parts, on the basis of adjacency relationship information between parts of the 3D CAD model information;
an unconnected part detecting section that detects unconnected parts on the basis of the connection precedence relationship and the assembly graph;
a work order adding section that adds work contents and work orders to a list of the detected unconnected parts to return to processing in the section that generates the directed graph having the connection precedence relationship; and
an assembly sequence/assembly direction/assembly action generating section that deduces an assembly sequence and an assembly direction for reversely converting a disassemblable direction and a disassembly sequence by generating the disassemblable direction and the disassembly sequence on the basis of the generated disassembly unit, the generated disassembly sequence plan, and the generated assembly graph;
wherein the unconnected part detecting section detects parts, which have the adjacency relationship but do not have the connection precedence relationship, as unconnected parts on the basis of the assembly graph and the connection precedence relationship created from the 3D CAD model information; and outputs an unconnected part list including information about parts, which form the unconnected parts, adjacent parts, and the adjacency relationship, and wherein the unconnected part detecting section detects the unconnected parts to create the unconnected part list; acquires characteristic shapes of the unconnected parts; groups axial vectors of the characteristic shapes and a vector between centers of the characteristic shapes that have the same direction; determines that portions having the characteristic shapes are adjacent portions for each of the groups when a distance between the centers of the characteristic shapes is equal to or smaller than a value of the sum of a half of the length of each of adjacent characteristic shapes and a value of a predetermined clearance; and outputs fastening part candidates, which are received in the minimum diameter of the characteristic shape of an adjacent portion, to the unconnected part list.

2. The apparatus according to claim 1,
wherein the part detecting section detects a fastening part by performing light ray scanning in the radial direction of the characteristic shape, and detects other parts, which are obstructive to the disassembly of the fastening part, by performing light ray scanning in an axial direction of the fastening part, and the section, which generates the directed graph having the connection precedence relationship, represents a relationship between the fastening part, which is detected by the part detecting section, and a fastening target part to which the fastening part is fastened and a relationship between the fastening part and other parts, which are obstructive to the disassembly of the fastening part, as the connection precedence relationship; and generates a graph in which a node denotes a part ID and a directed edge denotes the connection precedence relationship between parts.

3. The apparatus according to claim 1,
wherein the disassembly sequence plan generating section determines that a node not including an inner edge denotes a fastening part and a node including an inner edge is disassemblable in the directed graph generated by the section for generating the directed graph having the connection precedence relationship, calculates a difference between the number of inner edges and the number of outer edges, determines a part node of which the difference has a positive value as a base part, distinguishes groups of parts, which are connected to an inner edge input to the base part, as subassemblies, deduces disassembly sequences for the respective subassemblies, and generates a disassembly sequence plan by integrating these disassembly sequences.

4. The apparatus according to claim 1, further comprising:
a work estimation table that is stored in a storage section and allocates conditions of generation of work contents and work orders while an adjacency relationship between unconnected parts, the combinations of types of adjacent parts, and conditions of shapes and dimensions to be determined are used as a search key, wherein while using an adjacency relationship between unconnected parts, and conditions of the types, shapes, and dimensions of the unconnected parts as a search key in the unconnected part list created by the unconnected part detecting section, the work order adding section searches the work estimation table to estimate work contents and work orders of rows of the unconnected part list corresponding to the unconnected parts.

5. The apparatus according to claim 1,
wherein the unconnected part detecting section outputs an unconnected part list of results of detection of the unconnected parts from the 3D CAD model information to a display section, and the work order adding section displays a user interface on the display section; receives an instruction for adding a new row to the unconnected part list from a user; receives inputs of new parts, new work contents, and new work orders from the user and creates rows of new unconnected parts; and performs processing of the section, which generates the directed graph having the connection precedence relationship, again.

6. A method of generating an assembly sequence that generates information about assembly steps and an assembly sequence for sequentially assembling a plurality of parts of an assemblable product by using a computer, the method comprising, as processing steps performed by the computer:

an information acquiring step of extracting, from a three dimensional computer-aided design (3D CAD) model, information about a part attribute, part arrangement, and an adjacency relationship with other parts for each of the plurality of parts;

a part type classifying step of classifying types of parts from information about the 3D CAD model;

a characteristic shape detecting step of detecting designated characteristic shapes from the 3D CAD model;

a part detecting step of detecting a part present in a radial direction of each of the detected characteristic shapes and detecting a part present in an axial direction of the detected part in the 3D CAD model;

a step of generating a directed graph, in which a node denotes a part and a directed edge denotes a connection precedence relationship between parts and which has a connection precedence relationship, on the basis of results of the detection of the parts;

a disassembly sequence plan generating step of generating a disassembly unit and a disassembly sequence plan on the basis of the connection precedence relationship;

an assembly graph generating step of generating an assembly graph, in which a node denotes a part and an edge denotes an adjacency relationship and which represents a relationship between parts, on the basis of adjacency relationship information between parts of the 3D CAD model information;

an unconnected part detecting step of detecting unconnected parts on the basis of the connection precedence relationship and the assembly graph;

a work order adding step of adding work contents and work orders to a list of the detected unconnected parts to return to processing in the step of generating the directed graph having the connection precedence relationship; and an assembly sequence/assembly direction/assembly action generating step of deducing the assembly sequence and an assembly direction for reversely converting a disassemblable direction and a disassembly sequence by generating the disassemblable direction and the disassembly sequence on the basis of the generated disassembly unit, the generated disassembly sequence plan, and the generated assembly graph;

wherein the unconnected part detecting step detects parts, which have the adjacency relationship but do not have the connection precedence relationship, as unconnected parts on the basis of the assembly graph and the connection precedence relationship created from the 3D CAD model information; and outputs an unconnected part list including information about parts, which form the unconnected parts, adjacent parts, and the adjacency relationship; and wherein the unconnected part detecting step detects the unconnected parts to create the unconnected part list; acquires characteristic shapes of the unconnected parts; groups axial vectors of the characteristic shapes and a vector between centers of the characteristic shapes that have the same direction; determines that portions having the characteristic shapes are adjacent portions for each of the groups when a distance between the centers of the characteristic shapes is equal to or smaller than a value of the sum of a half of the length of each of adjacent characteristic shapes and a value of a predetermined clearance; and outputs fastening part candidates, which are received in the minimum diameter of the characteristic shape of an adjacent portion, to the unconnected part list.

7. The method according to claim 6, wherein the part detecting step detects a fastening part by performing light ray scanning in the radial direction of the characteristic shape, and detects other parts, which are obstructive to the disassembly of the fastening part, by performing light ray scanning in an axial direction of the fastening part, and the step of generating the directed graph having the connection precedence relationship represents a relationship between the fastening part, which is detected by the part detecting step, and a fastening target part to which the fastening part is fastened and a relationship between the fastening part and other parts, which are obstructive to the disassembly of the fastening part, as the connection precedence relationship; and generates a graph in which a node denotes a part ID and a directed edge denotes the connection precedence relationship between parts.

8. The method according to claim 6, wherein the disassembly sequence plan generating step determines that a node not including an inner edge denotes a fastening part and a node including an inner edge is disassemblable in the directed graph generated by the step for generating the directed graph having the connection precedence relationship, calculates a difference between the number of inner edges and the number of outer edges, determines a part node of which the difference has a positive value as a base part, distinguishes groups of parts, which are connected to an inner edge input to the base part, as subassemblies, deduces disassembly sequences for the respective subassemblies, and generates a disassembly sequence plan by integrating these disassembly sequences.

9. The method according to claim 6, further comprising:

a work estimation table that is stored in a storage section and allocates conditions of generation of work contents and work orders while an adjacency relationship between unconnected parts, the combinations of types of adjacent parts, and conditions of shapes and dimensions to be determined are used as a search key, wherein while using an adjacency relationship between unconnected parts, and conditions of the types, shapes, and dimensions of the unconnected parts as a search key in the unconnected part list created by the unconnected part detecting step, the work order adding step searches the work estimation table to estimate work contents and work orders of rows of the unconnected part list corresponding to the unconnected parts.

10. The method according to claim 6, wherein the unconnected part detecting step outputs an unconnected part list of results of detection of the unconnected parts from the 3D CAD model information to a display section, and the work order adding step displays a user interface on the display section; receives an instruction for adding a new row to the unconnected part list from a user; receives inputs of new parts, new work contents, and new work orders from the user and creates rows of new unconnected parts; and performs processing of the step, which generates the directed graph having the connection precedence relationship, again.

* * * * *